United States Patent [19]
Nakamura

[11] Patent Number: 5,309,228
[45] Date of Patent: May 3, 1994

[54] METHOD OF EXTRACTING FEATURE IMAGE DATA AND METHOD OF EXTRACTING PERSON'S FACE DATA

[75] Inventor: Hiroaki Nakamura, Kanagawa, Japan

[73] Assignee: Fuji Photo Film Co., Ltd., Kanagawa, Japan

[21] Appl. No.: 886,610

[22] Filed: May 21, 1992

[30] Foreign Application Priority Data

| May 23, 1991 | [JP] | Japan | 3-118746 |
| Dec. 5, 1991 | [JP] | Japan | 3-321596 |
| Dec. 12, 1991 | [JP] | Japan | 3-328997 |
| Dec. 12, 1991 | [JP] | Japan | 3-328998 |

[51] Int. Cl.⁵ ............................ G03B 27/72
[52] U.S. Cl. ........................ 358/500; 355/40
[58] Field of Search ........ 358/75, 76, 80; 355/32, 355/40; 382/16, 17, 18, 19

[56] References Cited

U.S. PATENT DOCUMENTS

| 4,613,897 | 9/1986 | Stansfield | 358/80 |
| 4,805,016 | 2/1989 | Kato | 358/98 |
| 4,984,013 | 1/1991 | Terashita | 355/38 |
| 5,204,948 | 4/1993 | Kato | 358/75 X |
| 5,206,918 | 4/1993 | Levene | 382/17 |

FOREIGN PATENT DOCUMENTS

| 52-156624 | 12/1977 | Japan . |
| 52-156625 | 12/1977 | Japan . |
| 53-12330 | 2/1978 | Japan . |
| 53-145620 | 12/1978 | Japan . |
| 53-145621 | 12/1978 | Japan . |
| 53-145622 | 12/1978 | Japan . |
| 62-115430 | 5/1987 | Japan . |
| 62-115431 | 5/1987 | Japan . |
| 62-115432 | 5/1987 | Japan . |
| 62-189456 | 8/1987 | Japan . |
| 62-189457 | 8/1987 | Japan . |
| 63-138340 | 6/1988 | Japan . |
| 63-178222 | 7/1988 | Japan . |

Primary Examiner—Bentsu Ro

[57] ABSTRACT

A color original image is divided into many picture elements and each picture element is resolved into three colors of red, green, and blue lights to photometrically measure them and a histogram of hue values is obtained in accordance with the data obtained through photometry. The obtained histogram is divided into mountains, it is judged which divided mountain each picture element of the color original image belongs to in order to classify the picture elements into groups corresponding to the divided mountains and divide the color original image every group. Then, at least one of the divided regions is selected to extract the data for the selected region as feature image data.

11 Claims, 27 Drawing Sheets

ORIGINAL IMAGE

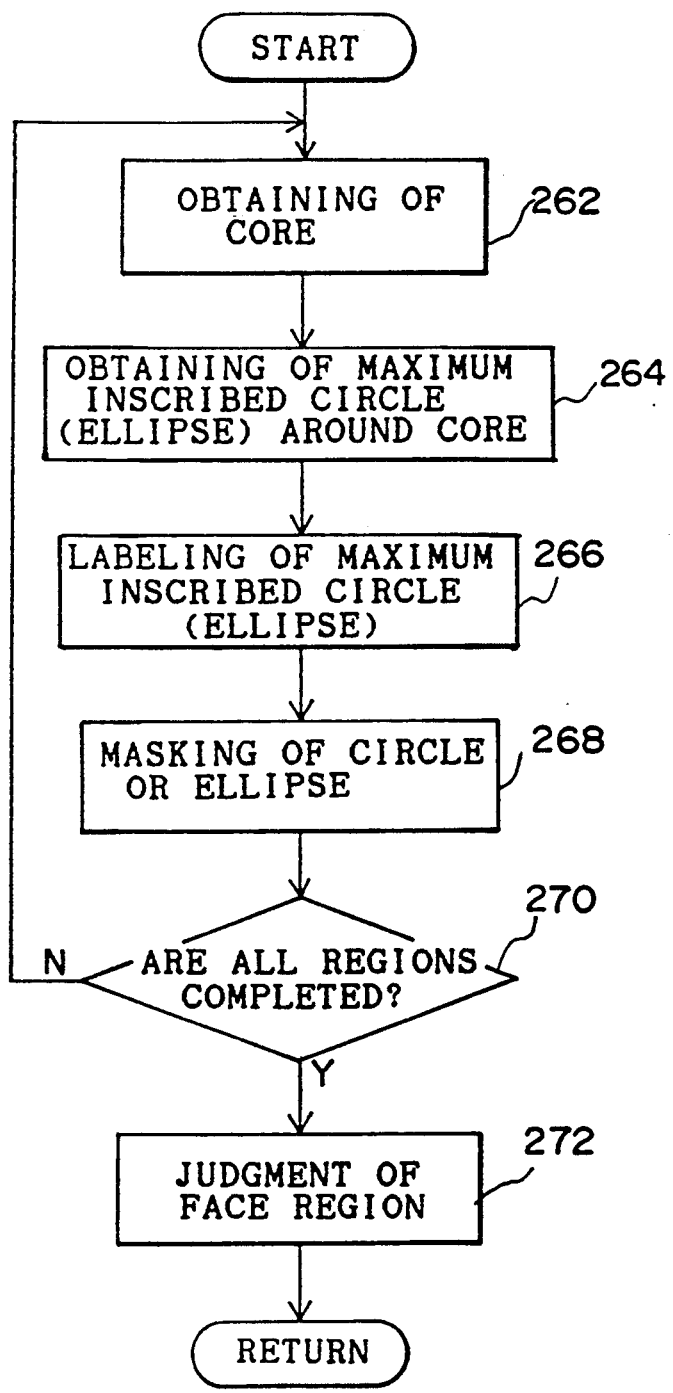

COLOR REGION INCLUDING FACE (REMARKED REGION)

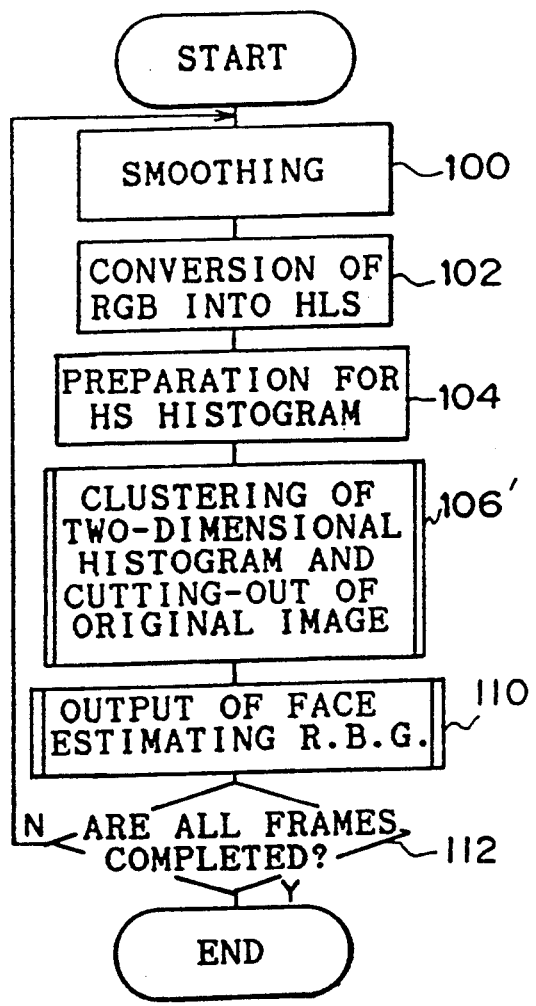

ORIGINAL IMAGE

FEATURE PLANE
Ec1
UNIT REGION

NO. OF PICTURE ELEM'TS

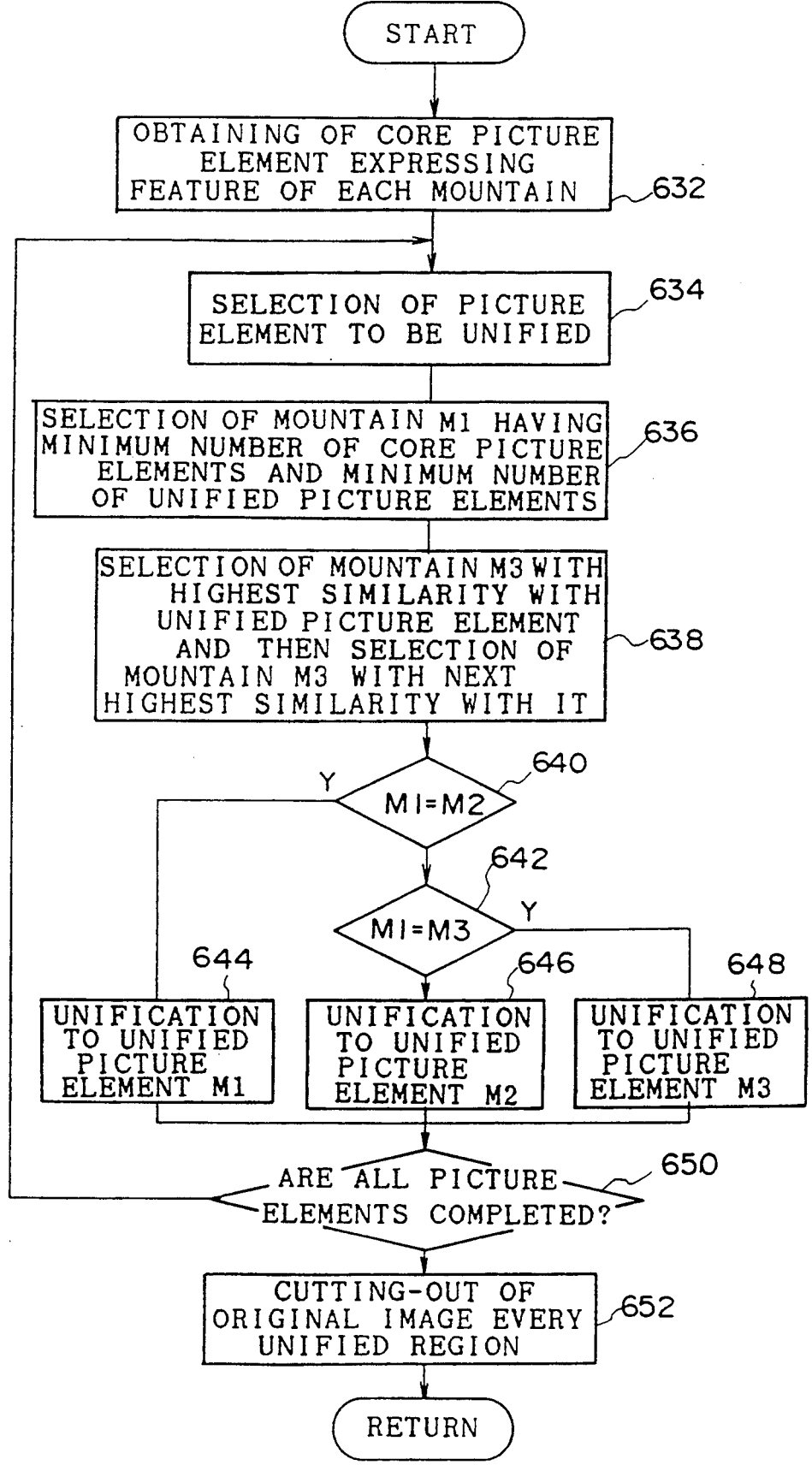

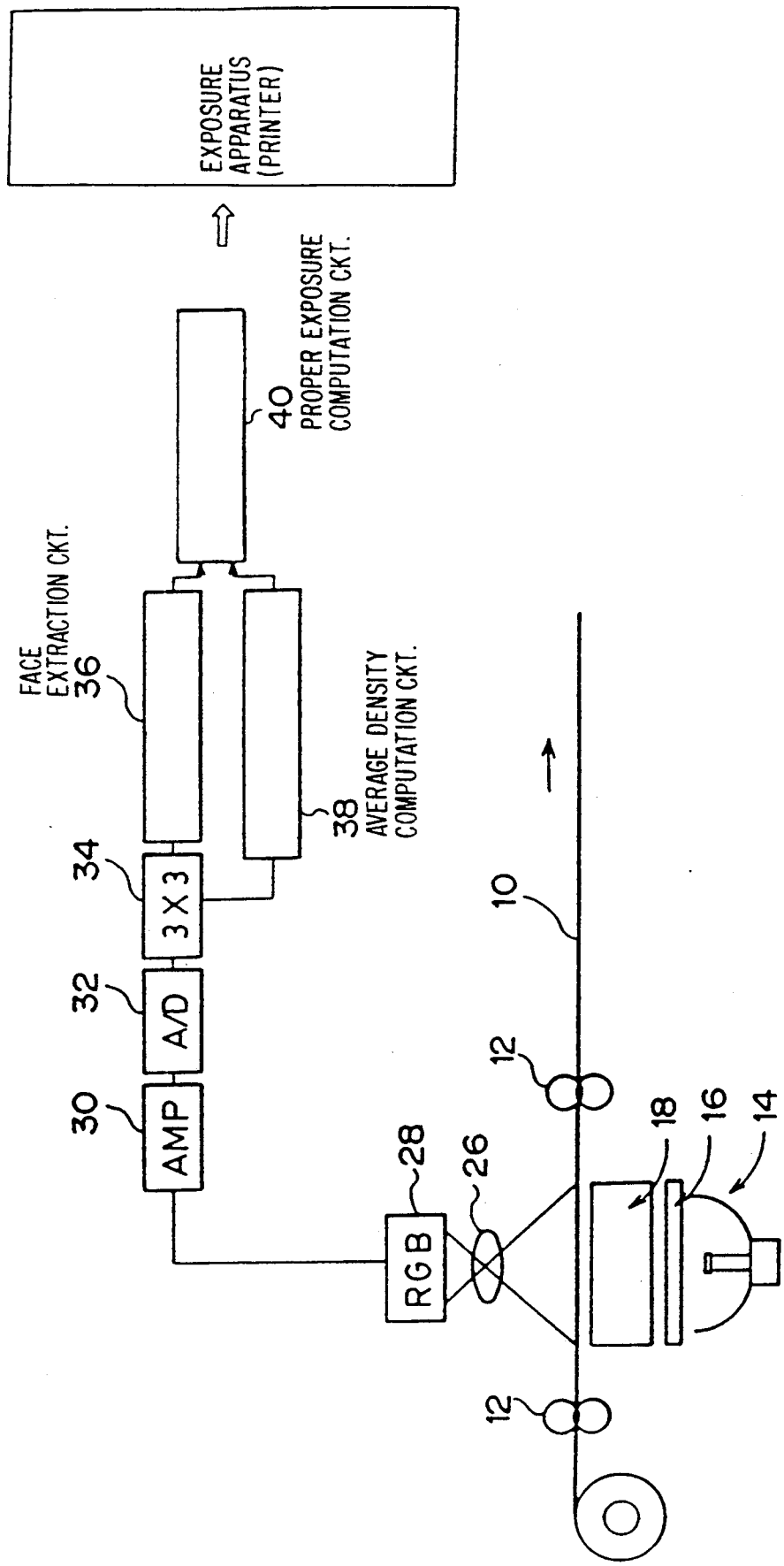

METHOD OF EXTRACTING FEATURE IMAGE DATA AND METHOD OF EXTRACTING PERSON'S FACE DATA

BACKGROUND OF THE INVENTION

1. Field of the Invention

The present invention relates to a method of extracting feature image data and a method of extracting person's face data, more particularly to a method of extracting feature image data and a method of extracting person's face density data used to copy a color original image to a color copying material or black-and-white copying material.

2. Description of the Related Art

A person's face is the most closely examined part of a portrait. To finish a high-quality photo, it is necessary to print the person's face with a proper color.

Conventionally, the face region in the original image of a color film is specified by a light pen to extract the data for the density of a person's face and the exposure is determined so that the face color is properly printed according to the extracted density data. This type of art is disclosed in the official gazettes, e.g., Japanese Patent Application Laid-Open Nos. 62-115430, 62-115431, 62-115432, 62-189456, 62-189457, 63-138340, and 63-178222.

However, the above related art has a problem that printing requires a lot of time because the operator has to specify the face region for each image by a light pen. Moreover, it is difficult to realize automation because the operator has to visually specify the face region.

Official gazettes, i.e., Japanese Patent Application Laid-Open Nos. 52-156624, 52-156625, 53-12330, 53-145620, 53-145621, and 53-145622, disclose the following method of extracting the data for person's face by extracting flesh-color data.

That is, an color original image is divided into many photometric points, each photometric point is resolved into three colors of R (red), G (green), and B (blue) to photometrically measure them, and it is judged if the color of each photometric point calculated from photometric data is kept within the flesh-color range. Then, a cluster (group) of the photometric points decided as a color within the flesh-color range is used for face density data.

For this method, however, because colors within the flesh-color range are assumed to be face density data, flesh color of ground, trunk of a tree, and clothes, or portions other than face having a color similar to flesh color are extracted as face density data. Moreover, when the same object is photographed under the same condition, it may not be possible to automatically extract face density data if the type of film differs because the color tone differs in photographed images. Furthermore, when the color of a light source for illuminating an object differs, it may not be possible to automatically extract face density data if the color of the light source differs because the color tone of a photographed image differs (for example, an image photographed by using a fluorescent light for the light source shows green tone).

To solve the problem caused by the difference of light-source color, it is only necessary to correct the light-source color before extracting photometric data within the flesh-color range. The light source can roughly be classified into sunlight, fluorescent light, and tungsten light. The color tone of sunlight depends on the season and time zone and also on direct or indirect light even if the season and time zone are the same.

Artificial light such as fluorescent light has various color tones because products are diversified. Therefore, it is difficult to correct the light source by specifying the type of light source for each light source. Even if light source correction can completely be performed, it is impossible to avoid extracting flesh color of ground and trunk of a tree or portions with a color similar to flesh color. Therefore, it is impossible to take action when the type of film differs.

SUMMARY OF THE INVENTION

The present invention is made to solve the above problem. It is the object of the present invention to provide a feature image data extraction method for automatically extracting only feature image data such as person's face data at a high accuracy from the color original image on a negative film or the like and to provide a person's face data extraction method for automatically extracting only person's face data at a high accuracy from it.

To achieve the above objects, the first embodiment divides a color original image into many picture elements to resolve each picture element into three colors of red, green, and blue lights and photometrically measure them, obtains the histogram of hue values in accordance with the data obtained through photometry, divides the obtained histogram into mountains, classifies picture elements into groups corresponding to the divided mountains by judging which divided mountain each picture element of the color original image belongs to, dividing the color original image for each group, and selecting at least one of the divided regions to extract the data for the selected region as feature image data.

For the first embodiment, it is possible to obtain a two-dimensional histogram on hue values and saturation values in accordance with the data obtained through photometry instead of a one-dimensional histogram on hue values, divide the obtained two-dimensional histogram into mountains, judge which divided mountain each picture element of the color original image belongs to in order to divide many picture elements into groups corresponding to the divided mountains, divide the color original image for each group, and select at least one of the divided regions to extract the data for the selected region as feature image data.

For the first embodiment, it is possible to extract person's face density data as feature image data by judging if a selected divided region is a person's face and selecting the region decided as a person's face.

For the first embodiment, a color original image is divided into many picture elements to resolve each picture element into three colors of red, green, and blue lights and photometrically measure them, and a histogram of hue values is obtained in accordance with the data obtained through photometry. Then, the obtained histogram is divided into mountains by separating them at the trough or the foot of mountain. Thereby, the hue value range of each mountain can be specified. Then, it is decided which divided mountain each picture element belongs to by judging which hue value range the hue value of each picture element belongs to and many picture elements are classified into groups (clusters) corresponding to the divided mountains. Then, the color original image is divided into regions corresponding to the divided groups. In this case, though picture elements included in the same region may be divided into different regions, picture elements included in different groups are not included in the same region. Therefore, the color original image is divided for each region including picture elements having hue values within the hue value range divided by the histogram. Accordingly, picture elements with hue values kept within the predetermined range are included in one region on the color original image. Thus, feature image data can be extracted by selecting at least one region showing the feature of the image because the data for the selected region shows feature image data.

The color tone of color original image is uniformly changed in the whole screen due to difference of the type of film or light source, change of film characteristic with time, or difference between developed films. However, divided regions of the color original image are not changed due to change of color tone because groups consisting of picture elements of an image are stored though only the position on the histogram changes even if the color tone changes. Therefore, the present invention makes it possible to extract person's face density data even if the color tone or color range of the color original image changes due to difference of the type of film or light source, change of film characteristic with time, or difference between developed films.

If the color original image is divided in accordance with a histogram of only hue values when the color tone of a feature image which is the featured portion of the image is the same as or similar to the color tone of other portion, it may not possible to discriminate the feature image from other portion. Therefore, the saturation value is adopted in addition to the hue value to obtain a two-dimensional histogram of hue values and saturation values, the two-dimensional histogram is divided into mountains to divide the color original image similarly to the above procedure, and at least one of the divided regions is selected to determine an exposure in accordance with the extracted feature image data.

Therefore, by using hue values and saturation values, feature image data can be extracted even if portions having a color tone same as or similar to the feature image are mixed.

Because a person's face is the focal point of a portrait, it is preferable to judge if a divided region of a color original image is a person's face and extract the data for the region decided as a person's face as feature image data. In this case, though feature image data or person's face data can be extracted in accordance with the histogram of hue values, it is also possible to extract person's face data in accordance with the two-dimensional histogram of hue values and saturation values. The color tone of person's face is similar to that of flesh color portions of ground and tree. However, the saturation of the face is different from that of other features in most cases. Therefore, person's face data can also be extracted from an image in which a person's face, ground, and trees are mixed, by extracting person's face data in accordance with the two-dimensional histogram of hue values and saturation values.

The data to be extracted as feature image data can be data other than person's face data.

Because it is rare that the shape of mountains of the two-dimensional histogram of hue and saturation values obtained in accordance with photometric data is simple, it may be difficult to divide the obtained two-dimensional histogram into mountains if each mountain has a complex shape. The following second and third embodiment divide even a two-dimensional histogram consisting of a complex shape into mountains.

The second embodiment divides a color original image into many picture elements to resolve each picture element into three colors of red, green, and blue lights and photometrically measure them, obtains a two-dimensional histogram of hue values and saturation values in accordance with the data obtained through photometry, cuts the two-dimensional histogram by a feature plane parallel with a coordinate plane including a cross section corresponding to the crest of a specific single mountain of the obtained two-dimensional histogram and also including the hue-value axis and saturation-value axis of the two-dimensional histogram to obtain cross sections of the two-dimensional histogram, executes the exclusive expansion for expanding each cross section until the interval between cross-section boundaries adjacent to the feature plane decreases to a predetermined value or less or until the frequency of the boundaries decreases to a predetermined value close to the minimum value or a predetermined value close to the minimum value or less to divide the two-dimensional histogram for each mountain at the cross-section boundaries after exclusive expansion, judges which divided mountain each picture element of the color original image belongs to in order to divide picture elements into groups corresponding to divided mountains, divides the color original image for each group, and selects at least one of the divided regions to extract the data for the selected region as feature image data.

For the second embodiment, it is possible to extract person's face density data as feature image data by selecting a divided region decided as a person's face.

For the second embodiment, a color original image is divided into many picture elements, each picture element is resolved into three colors of red, green, and blue lights to photometrically measure them, and a two-dimensional histogram of hue and saturation values is obtained in accordance with the data obtained through photometry.

For the second embodiment, cross sections of the two-dimensional histogram are obtained by cutting the two-dimensional histogram by a feature plane parallel with a coordinate plane including a cross section corresponding to the crest of a specific single mountain of the obtained two-dimensional histogram and also including the hue-value axis and saturation-value axis of the two-dimensional histogram. Therefore, exclusive expansion is applied to the cross sections on the feature plane. The exclusive expansion is a processing for expanding each cross section until the interval of cross-section boundaries adjacent to the feature plane decreases to a predetermined value or less. Thus, each cross section present on the feature plane expands but expansion stops at a boundary between mountains or a trough. When the frequency of the cross-section boundary to be expanded or the picture element value decreases to the minimum value or a predetermined value close to the minimum value or less, expansion stops. Thus, expansion of cross sections stops at the foot of each mountain. Therefore, the contour of a single mountain is obtained by the trough and foot of the mountain.

The two-dimensional histogram is divided into mountains at the cross-section boundary or the mountain contour after the exclusive expansion on the feature plane. Thereby, for a complex shape in which a plurality of mountains are overlapped in a two-dimensional histogram, the two-dimensional histogram can be divided into a plurality of mountains.

Then, by judging which hue- and saturation-value ranges of each divided mountain the hue and saturation values of color original image picture elements belong to, it is judged which divided mountain each picture element belongs to and many picture elements are classified into regions corresponding to divided groups (clusters). Then, the color original image is divided into regions corresponding to divided groups. In this case, though picture elements included in the same group may be classified into different regions, picture elements included in different regions are not included in the same region. Therefore, the color original image is divided for each region including the picture elements having hue and saturation values within the ranges of hue and saturation values divided by the histogram. Thus, feature image data can be extracted through region selection because picture elements whose hue and saturation values are kept within a predetermined range are included in one region on the color original image and the data for a selected region expresses feature image data by selecting at least one of the regions expressing the feature of the image.

Because the second embodiment uses hue and saturation values, feature image data can be extracted even if a portion with the hue same as or similar to that of a feature image is mixed.

Because a person's face is the focal point of a portrait, it is preferable to judge if a divided region of a color original image is a person's face and extract the data for the region decided as a person's face as feature image data. The hue of a person's face is similar to that of a flesh-color portion such as ground and trees but the saturation differs in most cases. Therefore, it is also possible to extract person's face data from an image in which faces, ground, and trees are mixed by extracting person's face data in accordance with a two-dimensional histogram of hue and saturation values.

The third embodiment divides a color original image into many picture elements to resolve each picture element into three colors of red, green, and blue lights and photometrically measure them, obtains a two-dimensional histogram of hue values and saturation values in accordance with the data obtained through photometry, divides each mountain of the obtained two-dimensional histogram into small mountains respectively having a crest by a feature plane which is parallel with a coordinate plane including the hue and saturation values of the two-dimensional histogram and includes the maximum cross section corresponding to only the crest of one mountain, judges which small mountain each picture element of the color original image is included in to classify each picture element into a group corresponding to each small mountain, obtains the degree of similarity between at least one picture element included in each small mountain and picture elements excluded from the small mountain in accordance with the hue and saturation values, unifies the picture elements excluded from the small mountain into groups in which the obtained degree of similarity corresponds to a high small mountain, divides the color original image for each unified group, and selects at least one of the divided regions to extract the data for the selected region as feature image data.

For the third embodiment, it is possible to obtain the degree of similarity between at least one picture element included in each small mountain and picture elements excluded from the small mountain every small mountain by obtaining core picture elements of the color original image corresponding to the crest of each small mountain and judging in the color original image whether or not the distance between the picture elements excluded from the small mountain and each core picture element is minimum.

For the third embodiment, it is also possible to obtain the degree of similarity between at least one picture element included in each small mountain and picture elements excluded from the small mountain every small mountain by obtaining core picture elements of the color original image corresponding to the crest of each small mountain and the degree of similarity between at least one picture element included in each small mountain and picture elements excluded from the small mountain and judging whether or not the distance between the picture elements excluded from the small mountain and each obtained core picture element is minimum.

Moreover, for the third embodiment, it is possible to extract person's face density data as feature image data by selecting a divided region decided as a person's face.

For the third embodiment, each mountain of the obtained two-dimensional histogram is divided into small mountains respectively having a crest by a feature plane which is parallel with a coordinate plane including hue and saturation values of the two-dimensional histogram and includes the maximum cross section corresponding to only the crest of one mountain. Thus, each mountain of the two-dimensional histogram is divided at the small mountain close to the crest which is a feature portion of only each mountain and the main hue- and saturation-value ranges of each mountain are determined.

Then, it is judged which divided small mountain each picture element of the color original image is included in to classify each picture element into a group (cluster) corresponding to the small mountain by judging which hue- and saturation-value ranges the hue and saturation values of each picture element are included in. Thus, the regions in which picture elements of the color original image are included in the small mountain are divided into regions including picture elements having hue and saturation values within the hue- and saturation-value ranges in accordance with the feature portion of each mountain of the two-dimensional histogram. Then, the degree of similarity between at least one picture element included in each small mountain divided in accordance with hue and saturation values and picture elements excluded from the small mountain is obtained every small mountain. The scale for obtaining degree of similarity uses the value statistically determined on a plane consisting of the hue- and saturation-value axes. It is also possible to use the value statistically determined in a feature space consisting of hue, saturation, and lightness. Then, picture elements excluded from a small mountain with the obtained high degree of similarity are unified to a group corresponding to the small mountain. Thus, it is possible to unify picture elements by the degree of similarity on the color original image even for a two-dimensional histogram with a complex shape to be hardly divided because a plurality of mountains are overlapped. Then, the color original image is divided every group unified in the above manner. Therefore, one divided region of the color original image includes similar picture elements in addition to those within the main hue- and saturation-value ranges. Thus, it is possible to the data for this region as feature image data by selecting at least one of the divided regions as the region for expressing the feature of the image.

For the third embodiment, the degree of similarity can be obtained as shown below. First, a picture element on the color original image corresponding to the crest of each small mountain, that is, a picture element corresponding to the crest (peak) of a two-dimensional histogram is obtained as a core picture element. Because the core picture element corresponds to the crest with the maximum number of picture elements or maximum frequency of each small mountain, hue and saturation values of the core picture element express the feature of each small mountain. It is also possible to obtain the core picture element in accordance with hue and saturation values of each small mountain. Then, the distance between picture elements excluded from the small mountain and each obtained core picture element is obtained in the color original image. In this case, it is more certain to unify picture elements excluded from the small mountain of the two-dimensional histogram into a group corresponding to the small mountain corresponding to a close core picture element on the color original image. Therefore, the picture elements excluded from the small mountain are unified to the group corresponding to the core picture element having the minimum obtained distance. Thus, because the picture elements to be unified can be unified to a small mountain corresponding to the core picture element having the minimum distance on the color original image, it is possible to unify the picture elements to be unified to a more certain region even if a plurality of similar picture elements are present on the color original image.

Moreover, for the third embodiment, it is possible to obtain the degree of similarity as shown below. First, as described above, a core picture element corresponding to each small mountain of the two-dimensional histogram is obtained and the distance between picture elements excluded from small mountains and each obtained core picture element is obtained in the color original image. Then, as described above, the degree of similarity between one or more picture elements included in each small mountain and picture elements excluded from the small mountain is obtained every small mountain. In this case, it may be difficult to judge which small mountain a picture element with a high degree of similarity belongs to in the two-dimensional histogram. Therefore, as described above, picture elements excluded from the small mountain are unified to a group corresponding to a small mountain corresponding to the core picture element having the obtained small distance and the obtained high degree of similarity because it is more certain to unify the picture elements to be unified to a group corresponding to a small mountain corresponding to the core picture element with a small distance on the color original image. Thus, because the picture elements to be unified are unified to a small mountain having the minimum distance between the picture element in the color original image and the core picture element corresponding to each small mountain of the two-dimensional histogram in addition to the degree of similarity in accordance with hue and saturation values of picture elements, it is possible to unify the picture elements to be unified to a more certain region on the color original image because the degree of similarity in accordance with distance is added on the color original image even if it is difficult to decide the unification to a specific region only with the degree of similarity of picture elements in the two-dimensional histogram and even if it is difficult to judge which region of the color original image they are unified to because of the two-dimensional histogram with a complex shape.

Because the present invention uses hue and saturation values, it is possible to extract feature image data even if a portion whose hue is the same as or similar to that of a feature image is mixed.

Because a person's face is the focal point of a portrait, it is preferable to judge if a divided region of a color original image is a person's face and extract the data for the region decided as a person's face as feature image data. The hue of a person's face is similar to that of a flesh-color portion such as ground and trees but the saturation differs in most cases. Therefore, it is also possible to extract person's face data from an image in which faces, ground, and trees are mixed by extracting person's face data in accordance with a two-dimensional histogram of hue and saturation values.

The data to be extracted as feature image data can be data other than person's face data.

Even if data can be extracted by excluding data for flesh-color portions of ground and trunk of trees or portions similar to flesh color, an image for a resort or pool includes many regions with the same color as a face in which much skin is exposed around the face and the regions around the face may be combined with the face region. Also there are some portraits in which a person rests his chin. In this case, images with the same color as the face are combined with the face region. Therefore, to extract the face region from the feature of the colors of the color original image, only the face region cannot be extracted but combined regions with the same color as the face are extracted. Thus, it is difficult to automatically extract the density data only for the face.

Therefore, the fourth and fifth embodiments automatically extract the data only for a person's face which is feature image data from the color original image on a negative film or the like.

The fourth embodiment divides a color original image into many picture elements to resolve each picture element into three colors of red, green, and blue lights and photometrically measure them, obtains color regions whose hue is the same as or similar to that of the color original image on the color original image in accordance with the data obtained through photometry, assumes circles or ellipses inscribed to the boundary portion between the obtained color regions, divides the regions obtained by circular or elliptic regions from the largest circle or ellipse in order, and selects at least one of the divided regions to extract the data for the selected region as person's face data.

The fifth embodiment divides a color original image into many picture elements to resolve each picture element into three colors of red, green, and blue lights and photometrically measure them, obtains color regions whose hue is the same as or similar to that of the color original image on the color original image, assumes circles or ellipses inscribed to the boundary portion between the obtained color regions to obtain the largest circular or elliptic region and a convex region with a predetermined area or more protruding outward from the circumference of the circle or ellipse and contacting the obtained regions, divides the color regions by the circular region inscribed to the boundary portion between color regions included in the convex region, and selects at least one of the divided regions to extract the data for the selected region as person's face data.

Because a person's face is the focal point of a portrait, it is preferable to extract data for the person's face region from a color original image and use the data as feature image data. Because most person's faces are circular or elliptic, the person's face region is more certainly extracted by preferentially extracting circular regions from the same color regions of the color original image.

Therefore, for the fourth embodiment, a color original image is divided into many picture elements to resolve each picture element into three colors of red, green, and blue lights and photometrically measure them and color regions with the same or similar hue are obtained on the color original image. Then, circles or ellipses inscribed to the boundary portion between the obtained color regions are assumed and the color regions obtained by circular or elliptic regions are divided from the largest circle or ellipse in order. Thus, it is more certain that the finally-divided region is an independent region of only a face. Each divided color region of the color original image is further divided into regions to be more certainly extracted as a face region. By selecting at least one region expressing the feature of the image. the data for the selected region expresses feature image data. Therefore, feature image data can be extracted through region selection.

When the face region contacts a portion other than the face (for example, when a person is photographed from a diagonally upper position at a pool, the face region is buried in his body), the face region may be divided and extracted if the circle inscribed to the color region is preferentially divided. Therefore, for the fifth embodiment, color regions with the same or similar hue are obtained on a color original image in accordance with the data obtained through photometry as described in the fourth invention.

Then, circles or ellipses inscribed in the boundary portion between the obtained color regions are assumed to obtain the largest circle or ellipse. When a convex region with a predetermined area or more protruding outward from the circumference of circle or ellipse contacts the obtained region, the color regions are divided by the circular region inscribed to the boundary portion between the color regions included in the convex region. Thus, a circular or elliptic region to be more certainly extracted as a person's face region can preferentially be divided as a person's face region even if similar color regions contact each other on the color original image and, by selecting at least one of the divided regions, the data for the selected region can be extracted as feature image data.

BRIEF DESCRIPTION OF THE DRAWINGS

FIG. 11 is a flow chart showing the details of the step 110 of the fourth embodiment;

FIG. 15 is a flow chart showing the face extraction routine of the sixth embodiment;

FIG. 22 is a flow chart showing the details of the step 108 of the seventh embodiment;

FIG. 25 is a schematic diagram of another exposure computation apparatus to which the present invention is applied;

DETAILED DESCRIPTION OF THE PREFERRED EMBODIMENTS

Figure 1:
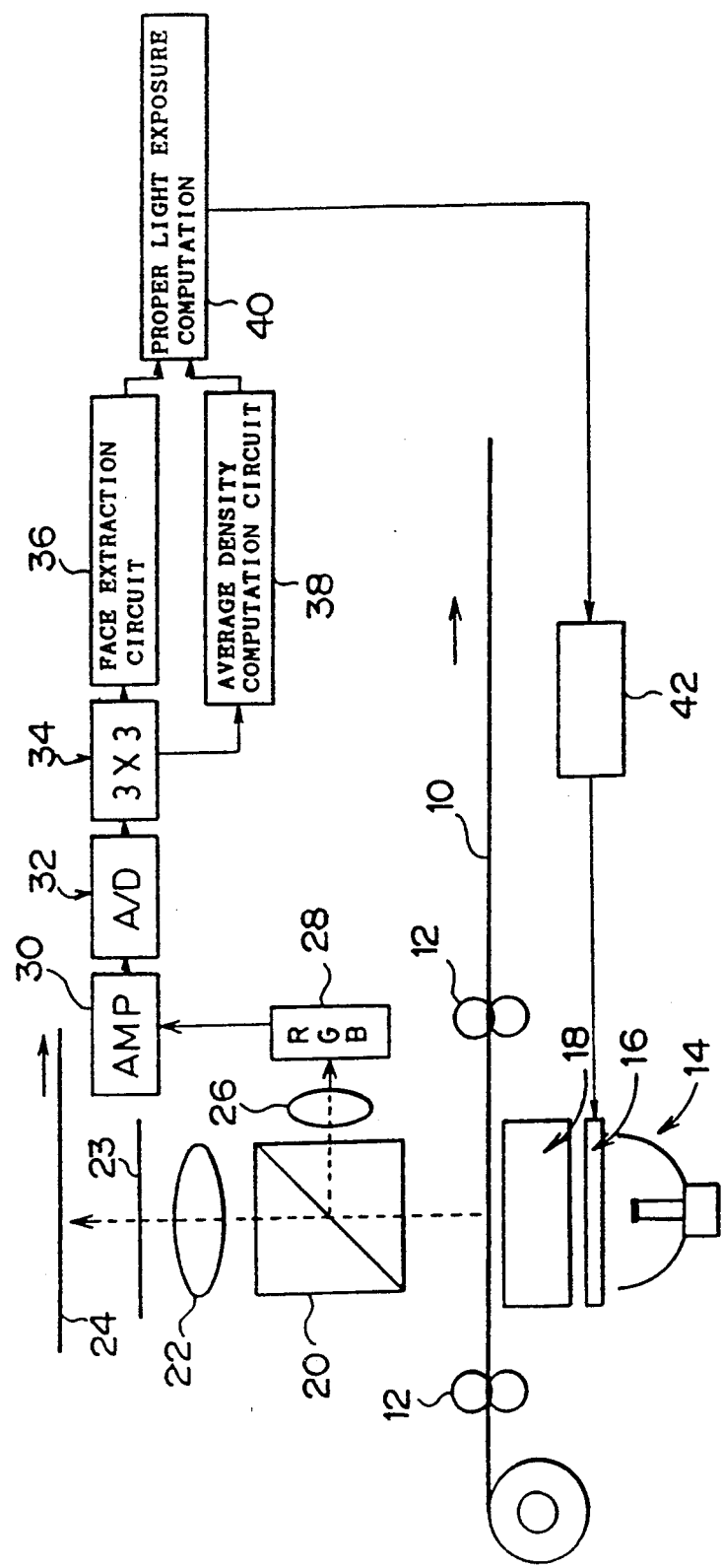
FIG. 1 is a schematic diagram showing the printer which is the first embodiment of the present invention.

The first embodiment of the present invention is described below in detail by referring to the accompanying drawings. The embodiment is made by applying the present invention to an automatic printer. As shown in FIG. 1, the automatic printer of this embodiment has carrying rollers 12 for carrying a color negative film 10. A light source 14, color correction filter 16 such as a color modulation filter, and diffusion box 18 are arranged in order under the negative film 10 to be carried by the carrying rollers 12. A distribution prism for distributing the ray transmitted through the negative film 10 in two ways is arranged above the negative film 10. A projective optical system 22, black shutter 23, and color paper (photographic paper) 24 are arranged in order on one optical path distributed by the distribution prism 20, and a projective optical system 26 and a CCD image sensor 28 are arranged in order on the other optical path. The CCD image sensor 28 divides one full screen (one frame) of the negative film 10 into many picture elements (e.g. 256×256 picture elements) and resolves each picture element into three colors of R (red), G (green), and B (blue) to photometrically measure them. The CCD image sensor 28 is connected to a 3×3 matrix circuit 34 for correcting the sensitivity of the CCD image sensor through an amplifier 30 for amplifying the CCD image sensor output and an analog-to-digital (A-D) converter 32. The 3×3 matrix circuit 34 is connected to a proper exposure computation circuit 40 through a face extraction circuit 36 consisting of a microcomputer storing the program of a routine to be described later and through an average density computation circuit 38 for computing the average density of one full screen. The proper exposure computation circuit 40 is connected to the color correction filter 16 through a driver 42 for driving the color correction filter.

The following is the description of functions of this embodiment. The ray emitted from the light source 14 passes through the color correction filter 16, diffusion box 18, and color negative film 10, and is distributed by the distribution prism 20 and received by the CCD image sensor 28.

In this case, the black shutter 28 is closed. When the CCD image sensor 28 receives the ray, it divides one full screen into many picture elements, resolves each picture element into three colors of R, G, and B to photometrically measure them, and outputs a photometric data signal. The photometric data signal is amplified by the amplifier 30 before it is converted into a digital signal by the A-D converter 32. Then, the sensitivity of the image sensor is corrected by the 3×3 matrix circuit 34 and the digital signal is inputted to the face extraction circuit 36 and the average density computation circuit 38. The average density computation circuit 38 computes the average density of one full screen. The face extraction circuit 36, as described later, estimates the portion of a person's face in one screen and outputs three-color photometric data for R, G, and B. The exposure computation circuit 40 computes an exposure by using the three-color photometric data outputted from the face extraction circuit 36 and the average density obtained by the average density computation circuit 38, controls the color correction filter 16 through the driver 42, and performs printing by operating the black shutter 23. The exposure correction value for the average density can be obtained by using the average density obtained by the average density computation circuit 38. Unless the exposure correction value is obtained, the average density computation circuit 38 is not always necessary and it is possible to directly obtain an exposure from the three-color photometric data outputted by the face extraction circuit 36.

Figure 2:
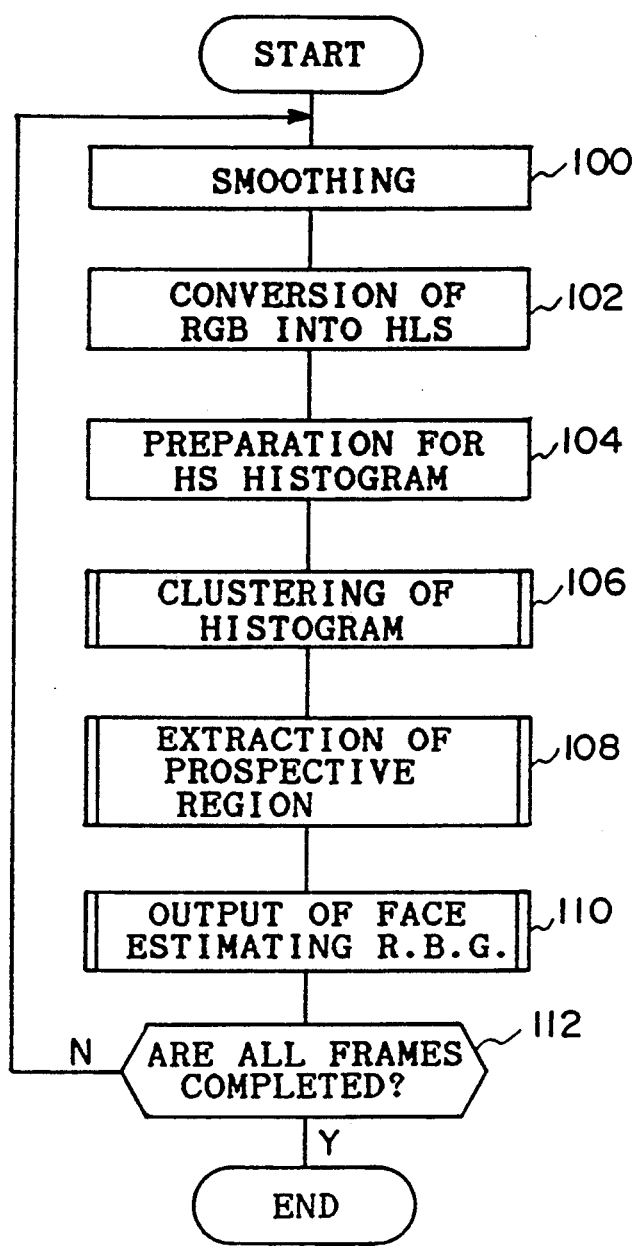
FIG. 2 is a flow chart showing the face extraction routine of a face extraction circuit.

FIG. 2 shows a face extraction routine by the face extraction circuit 36, in which elimination of noises from inputted three-color photometric data, that is, smoothing is executed in the step 100. In the next step 102, three-color photometric data for R, G, and B is converted into H (hue value), L (lightness value), and S (saturation value).

$$L = (R + G + B)/3 \quad (1)$$

$$S = 1 - \min(r', g', b') \quad (2)$$

$$H = H'/2Pi \quad (3)$$

Figure 3:
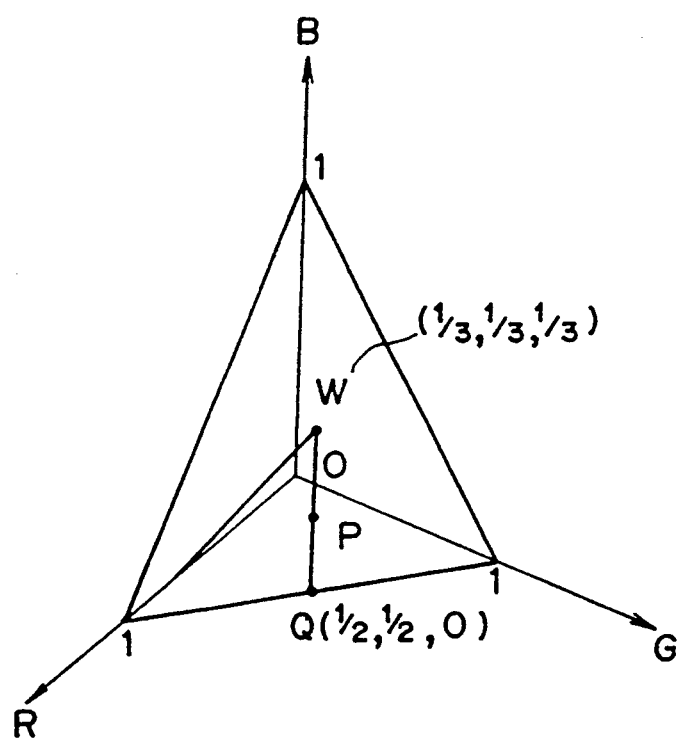
FIG. 3 is a diagram showing color coordinates.

Where, R, G, and B are three-color photometric data specified so that the minimum value is 0 and the maximum value is 1 respectively as shown in the three-dimensional coordinates in FIG. 3; "min ( )" is the minimum value of the values in parentheses; and r', g', and b' represent r' = R/L, g' = G/L, and b' = B/L. H' is given by the following expression (4) and Pi ("i" is one of R, G, and B) is P in FIG. 3.

$$H' = \frac{Pi}{2} - \tan^{-1} \frac{x}{\sqrt{1-x^2}} \quad (4)$$

Where, $$x = \frac{2(R - L)^2 + (G - L)^2 + (B - L)^2}{6L(R - L)^2 + (G - L)^2 + (B - L)^2}$$

Figure 4A:
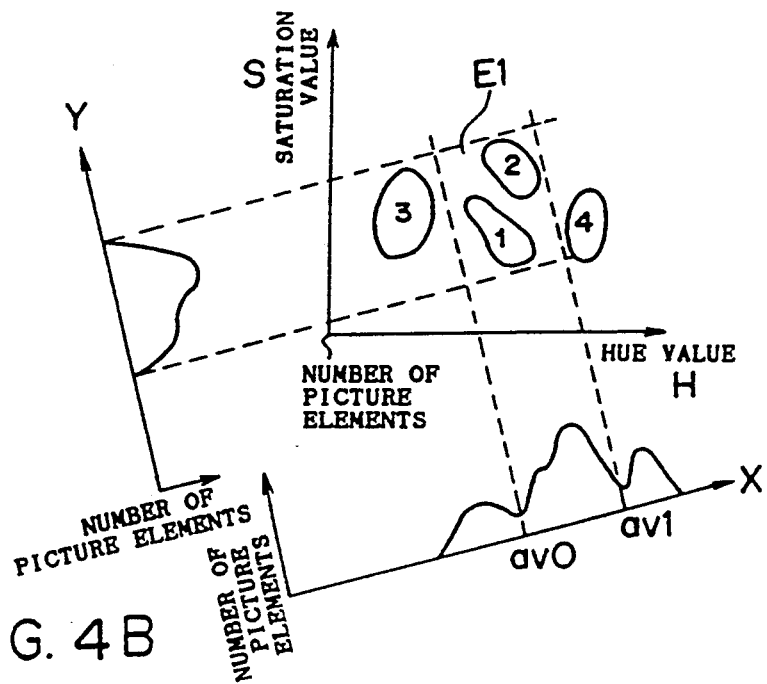
FIG. 4A is a diagram showing a two-dimensional histogram of hue values and saturation values.

In the step 104, a two-dimensional histogram of hue values and saturation values is obtained by using a coordinate system consisting of the hue value axis, saturation value axis, and number-of-picture-element axis which are perpendicular to each other as shown in FIG. 4A. In the step 106, as described later, the obtained two-dimensional histogram is divided into mountains, that is, the two-dimensional histogram is clustered. In the next step 108, many picture elements are clustered in accordance with the mountains of the clustered two-dimensional histogram and a screen is divided in accordance with the clustering to extract an region prospective for a person's face among divided regions.

In the next step 110, the region of a face is estimated from the region extracted as a prospect of the face and three-color photometric data for R, G, and B of the region estimated as the face is outputted. In the step 112, it is judged if all frames are printed. If so, the routine is completed.

Figure 4B:
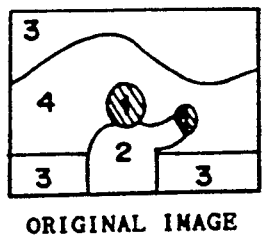
FIG. 4B is a diagram showing a divided original image.
Figure 4C:
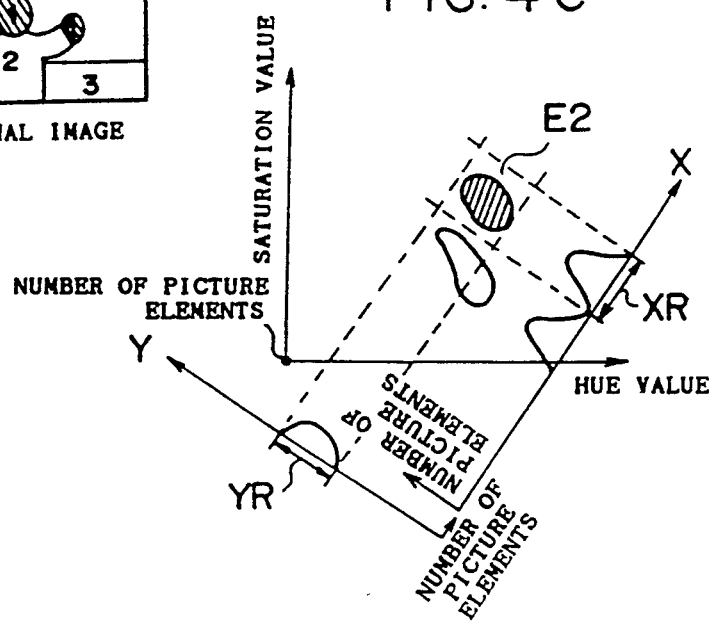
FIG. 4C is a diagram showing the single mountain with one crest extracted from the two-dimensional histogram.
Figure 5:
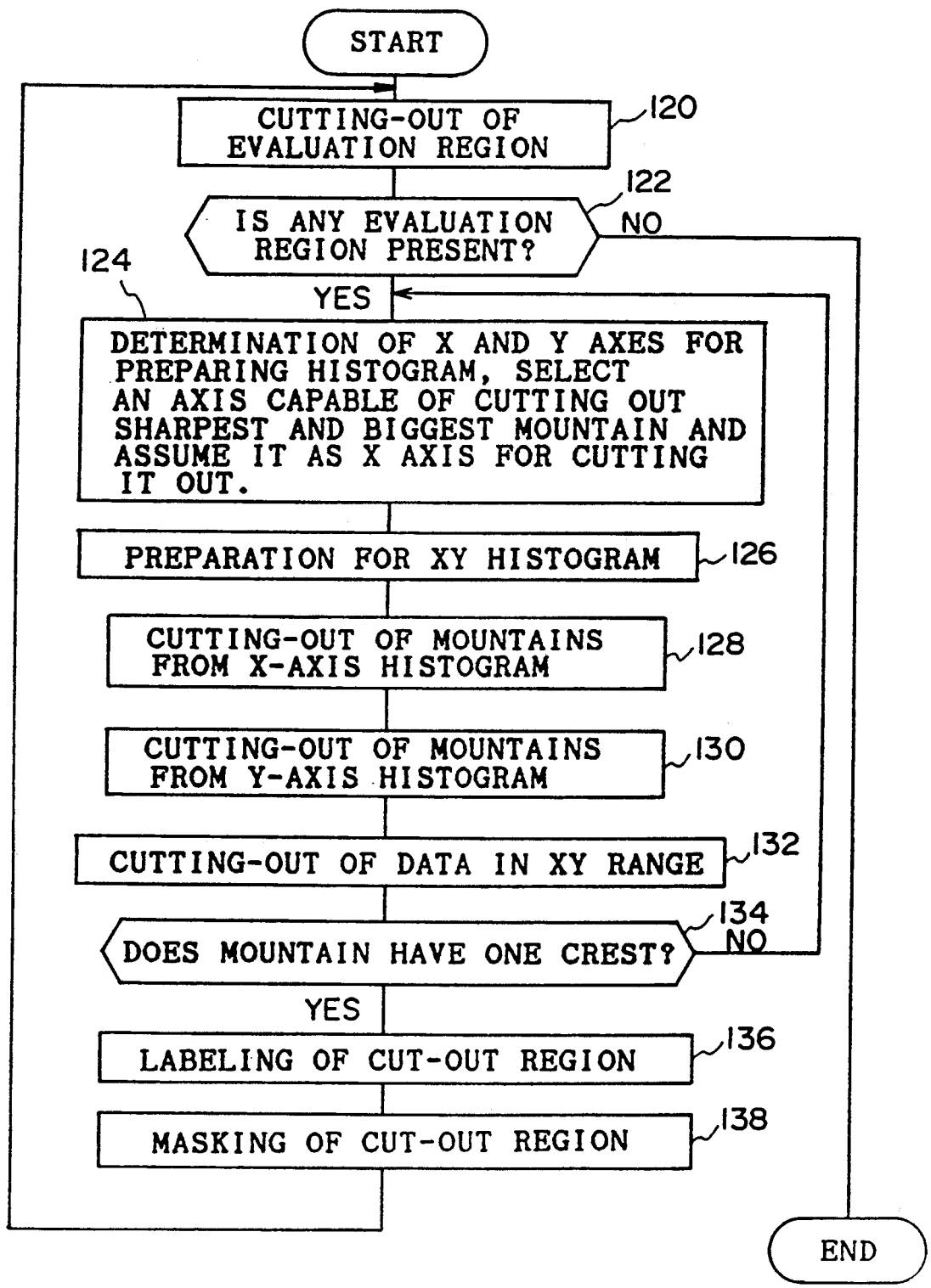
FIG. 5 is a flow chart showing details of the step 106 in FIG. 2.

The following is the description of details of the above steps 106 through 110. FIG. 5 shows details of the step 106. In the step 120, a region to be evaluated is cut out of the two-dimensional histogram of hue values and saturation values. In FIG. 4, one frame is used as an evaluation region to simplify explanation. In the step 122, it is judged if any evaluation region is present.

When the evaluation region cannot be cut out in the step 120, that is, when evaluation of all regions is completed, the routine is completed because no evaluation region is present. When any evaluation region is present, X and Y axes are determined to make a histogram for cutting out mountains in the step 124. That is, the evaluation region is rotated around the axis parallel with the number-of-picture-element axis to obtain a position where priority is given to multi-crest property and the mountains become sharpest when viewing mountains of the histogram from the side and determine the X and Y axes on the basis of the position. When the processing time should be decreased, it is possible to use either X or Y axis in which the variance of the histogram is maximized though the accuracy slightly decreases. For the example in FIG. 4A, the position where priority is given to multi-crest property and mountains become sharpest when viewing four mountains marked with numerals 1 through 4 from the side is the position where three mountains can be seen. Therefore, X axis is determined in the direction perpendicular to the direction when they can be seen and Y axis is determined in the direction perpendicular to the X axis.

In the next step 126, each one-dimensional histogram is made by projecting the two-dimensional histogram on X and Y axes. For the example in FIG. 4A, when viewing the mountains from the direction perpendicular to X axis, three mountains including the mountain marked with the numerals 3, the mountain marked with numerals 1 and 2, and the mountain marked with numeral 4 appear in the one-dimensional histogram about X axis because the mountains marked with numerals 1 and 2 are overlapped like one mountain. When viewing the mountains from the direction perpendicular to X axis, one mountain appears in the one-dimensional histogram about Y axis because the mountains marked with numerals 1 through 4 are overlapped like one mountain. In the next step 128, the histogram is converted into a performance function H (a) by the following expression (5) and mountains are cut out of the histogram about X axis in accordance with the performance function.

$$H(a) = \Sigma \frac{2f(a) - f(a + x) - f(a - x)}{x} \quad (5)$$

Where, "f (a)" is the number of picture elements when the value (feature value) in X-axis direction is "a" and "x" is the deviation from the feature value "a".

That is, the average value T of the performance function H (a) is obtained and the range (trough and foot existing range) lower than the average value T of the performance function H (a) is obtained. Then, the position where the histogram within this range is minimum is obtained as the trough or foot of the histogram. Then, the histogram is cut out at the obtained trough or foot.

Figure 6:
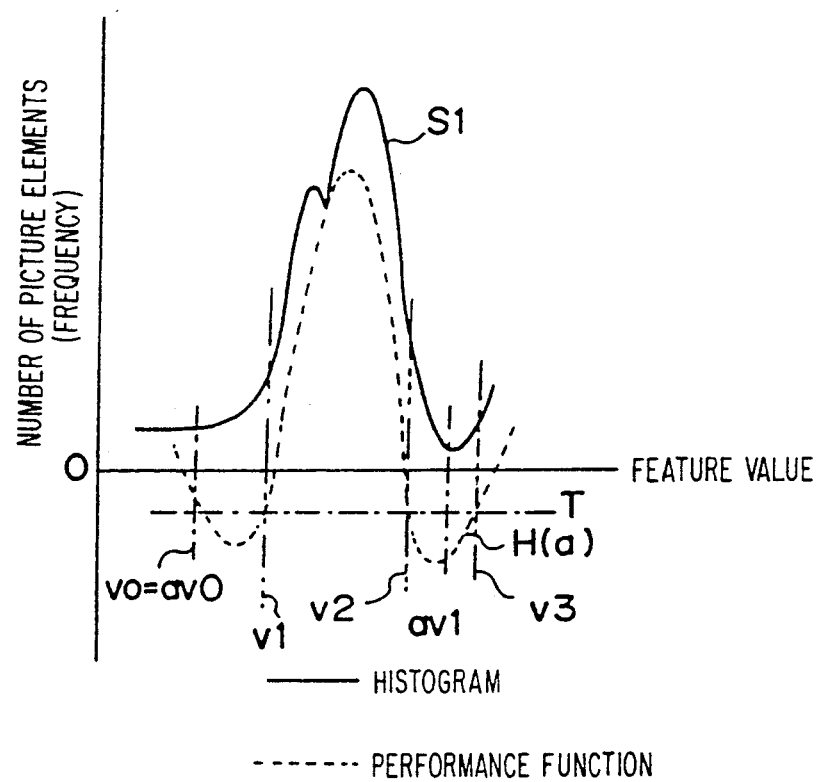
FIG. 6 is a diagram showing a histogram and a performance function.

The following is the description of cutting out the above mountain by referring to FIG. 6. The broken line in FIG. 6 represents the performance function H (a) obtained from the histogram shown by the continuous line S1. The range in which the performance function H (a) is equal to or lower than the average value T about the negative portion is the range in which the feature value ranges between v0 and v1 and between v2 and v3. The position where the frequency of the histogram within this range is minimized is av0=v0 for the range between v0 and v1 and av1 for the range between v2 and v3, and av0 is obtained as a foot and av2 is obtained as a trough. The histogram is cut out at these positions.

In the step 130, mountains of the histogram about Y axis are cut out similarly to cutting-out of mountains of the histogram about X axis. In the next step 132, an region where mountains of the one-dimensional histogram about X and Y axes cut out in the above manner on the two-dimensional histogram are overlapped is obtained to cut mountains out of the two-dimensional histogram of hue values and saturation values. The region E1 in FIG. 4A shows the mountains cut out in the above manner.

In the next step 134, it is judged if the mountain cut out of the two-dimensional histogram has one crest. If not, Steps 124 through 134 are repeated until the mountain cut out of the two-dimensional histogram has one crest. The region E2 in FIG. 4C shows the one-crest mountain cut out in the above manner.

In the next step 136, the processing for providing cutout one-crest mountains with a label to identify them (i.e. labeling) is performed. In the step 138, labeled mountains are masked to restart the step 120. The above steps are repeated to divide all regions of the two-dimensional histogram of hue values and saturation values into one-crest mountains.

Figure 7:
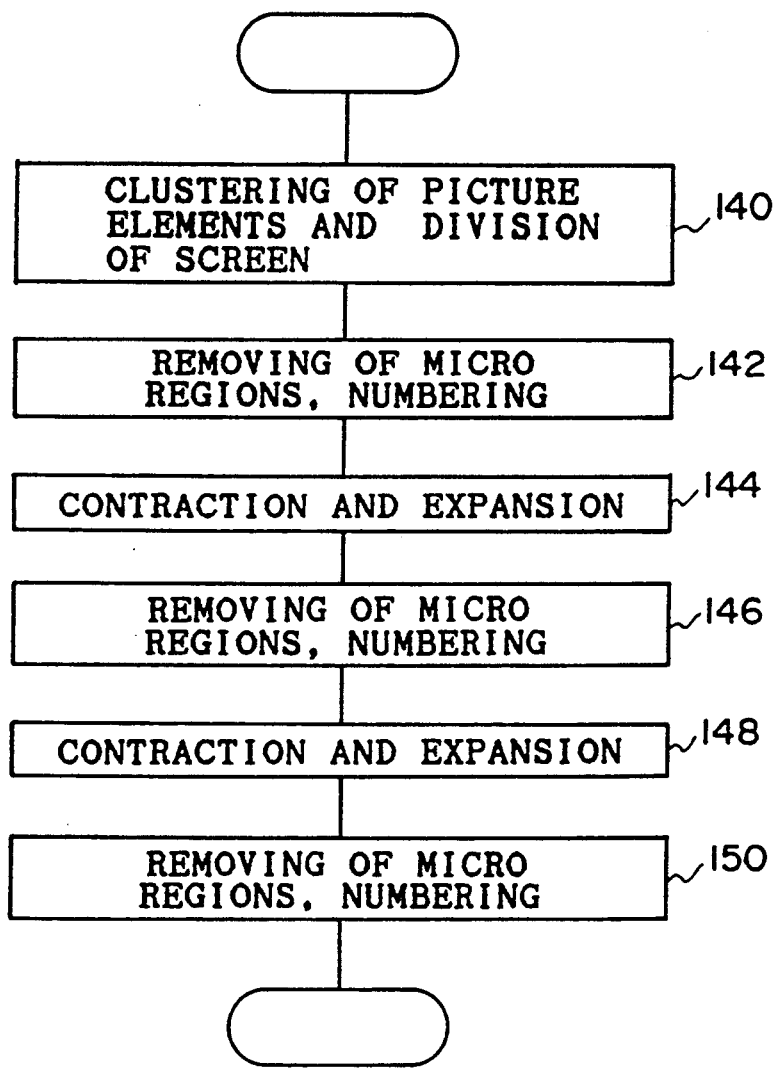
FIG. 7 is a flow chart showing details of the step 108 in FIG. 2.

FIG. 7 shows the details of the step 108. In the step 104, the X-axis directional range XR (FIG. 4C) of one-crest mountains divided in the above manner and the Y-axis directional range YR (FIG. 4C) of them are obtained for each one-crest mountain, it is judged about each picture element of the original image if hue values and saturation values are kept within these ranges in order to cluster picture elements, and the picture elements enclosed by the ranges XR and YR are collected to divide the original image so that the collected picture elements form one region on the original image. The divided regions are numbered. FIG. 4B shows a divided original image, in which the picture elements in regions marked with numerals 1 through 4 correspond to the picture elements enclosed by one-crest mountains marked with numerals 1 through 4. The picture elements belonging to the same one-crest mountain in FIG. 4A are divided into different regions in FIG. 4B. This is because the picture elements having the hue value range and saturation value range of one-crest mountain in FIG. 4A are located in different regions in FIG. 4B.

In the next step 142, micro regions are removed and numbering is retried by judging the area of divided regions. In the next step 144, small regions connected with a large region are separated from the large region by executing contraction for removing all picture elements at the boundary between regions to remove one layer and expansion for increasing picture elements at the boundary in the background picture element direction to add one layer contrary to contraction. In the next step 146, numbering is executed by removing micro regions similarly to the step 142 and contraction and expansion similar to the above are executed to separate regions slightly bonded in the step 148 from each other. In the step 150, removal of micro regions and numbering are executed similarly to the above.

Figure 8:
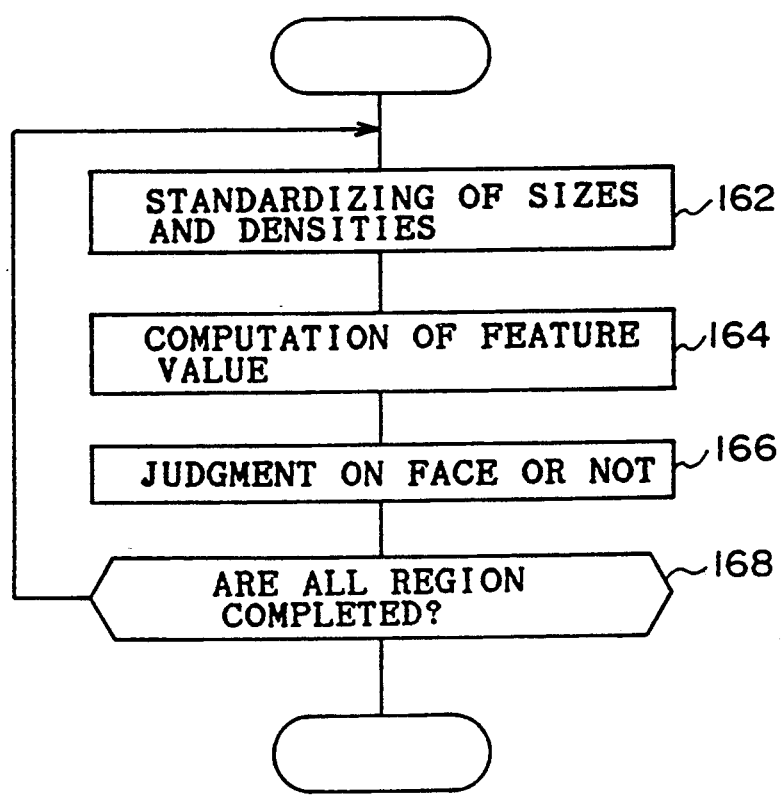
FIG. 8 is a flow chart showing details of the step 110 in FIG. 2.

FIG. 8 shows the details of the step 110. In the step 162, one region is selected as a remarked region among the regions extracted by the routine in the step 108 or FIG. 7, the size of the remarked region is standardized by expanding and contracting the remarked region so that the horizontal-and vertical-fillet diameters of the remarked region will have the predetermined value, and the density or brightness value is standardized in accordance with the following expression (6).

$$d_r = \frac{d_g}{d_{max} - d_{min}} - (d - d_{min}) \quad (6)$$

Where,
- dmax: Maximum density value (or brightness value) in region
- dmin: Minimum density value (or brightness value) in region
- ds: Full-scale density value (or brightness value) of image sensor
- dr: Standardized density value (or brightness value).

In the step 164, the correlation coefficient "gamma" of the remarked region for previously stored several types (ten types for this embodiment) of standard face images (e.g. face images viewed from the front, viewed from the side (right and left respectively), turned downward, and turned upward) is computed by the following expression (7) and the correlation coefficient is assumed as the feature value. These standard face images can be the data for only the contour of face or the data obtained by adding the data for internal structures of face (e.g. eyes, nose, and mouth) to the data for the contour of face.

$$r = \frac{\sigma_{fg}}{\sigma_f \sigma_g} \qquad (7)$$

where, $$\sigma_{fg} = \frac{1}{T^2} \sum_x \sum_y f(x,y)g(x,y) - \frac{1}{T^2} \sum_x \sum_y f(x,y) \cdot \frac{1}{T^2} \sum_x \sum_y g(x,y)$$

$$\sigma_f = \left\{ \frac{1}{T^2} \sum_x \sum_y (f(x,y))^2 - \frac{1}{T^2} \sum_x \sum_y (f(x,y))^2 \right\}^{\frac{1}{2}}$$

$$\sigma_g = \left\{ \frac{1}{T^2} \sum_x \sum_y (g(x,y))^2 - \frac{1}{T^2} \sum_x \sum_y (g(x,y))^2 \right\}^{\frac{1}{2}}$$

Where, T represents the horizontal- and vertical-fillet diameters of image (both fillet diameters are the same in this case), "f (x, y)" represents the remarked region, and "g (x, y)" represents the standard face image.

In the step 166, it is judged whether or not the remarked region is a person's face through the linear discrimination analysis using the above feature value as a variable and R-, G-, and B-photometric data for the region decided as a face is outputted to the proper exposure computation circuit 40. In the step 168, it is judged if the decision on whether or not all extracted regions belong to a face is completed. If not, the steps 162 through 168 are repeated.

In the above case, the correlation coefficient is used as the feature value for the judgment on a person's face. However, it is also possible to use the invariant, autocorrelation function, or geometrical invariant obtained from the central moment.

When assuming the (p+q)-degree central moment "$mu_{pq}$" of the image "f (x, y)" around the center of gravity as:

$$\mu_{pq} = \sum_x \sum_y (x - \bar{x})^p (y - \bar{y})^q f(x,y)$$

Where, $$\bar{x} = \frac{m_{10}}{m_{00}}$$

$$\bar{y} = \frac{m_{01}}{m_{00}}$$

$$m_{pq} = \sum_x \sum_y x^p y^q f(x,y)$$

$$(p, q = 0, 1, 2 \ldots )$$

The normalized central moment "$eta_{pq}$" around the center of gravity is shown as follows:

$$\eta_{pq} = \frac{\mu_{pq}}{(\mu_{00})^\gamma}$$

Where,
$\gamma = (p + q + 2)/2$
$p + q = 2, 3, \ldots$

From the above, the following seven invariants "Psi-i" ($i = 1, 2, \ldots,$ and 7) are obtained from the secondary and tertiary normalized central moments around the center of gravity.

$$\Phi_1 = \eta_{20} + \eta_{02}$$

$$\Phi_2 = (\eta_{20} - \eta_{02})^2 + 4\eta_{11}^2$$

$$\Phi_3 = (\eta_{30} - 3\eta_{12})^2 + (3\eta_{21} - \eta_{03})^2$$

$$\Phi_4 = (\eta_{30} + \eta_{12})^2 + (\eta_{21} + \eta_{03})^2$$

$$\Phi_5 = (\eta_{30} - 3\eta_{12})(\eta_{30} + \eta_{12})[(\eta_{30} + \eta_{12})^2 - 3(\eta_{21} + \eta_{03})^2] + (3\eta_{21} - \eta_{03})(\eta_{21} + \eta_{03}) \times [3(\eta_{30} + \eta_{12})^2 - (\eta_{21} + \eta_{03})^2]$$

$$\Phi_6 = (\eta_{20} - \eta_{02})[(\eta_{30} + \eta_{12})^2 - (\eta_{21} + \eta_{03})^2] + 4\eta_{11}(\eta_{30} + \eta_{12})(\eta_{21} + \eta_{03})$$

$$\Phi_7 = (3\eta_{21} - \eta_{03})(\eta_{30} + \eta_{12})[(\eta_{30} + \eta_{12})^2 - 3(\eta_{21} + \eta_{03})^2] + (3\eta_{12} - \eta_{30})(\eta_{21} + \eta_{03}) \times [3(\eta_{30} + \eta_{12})^2 - (\eta_{21} + \eta_{03})^2].$$

The autocorrelation function Rf is expressed as follows:

$$R_f = \sum_x \sum_y f(x,y) f(x + s, y + t)$$

And the geometrical invariant feature value is expressed as follows:

$$X_f = \sum_x \sum_y f(x,y) f(x + s, y + t) f(x + u, g + u)$$

The proper exposure computation circuit 40 computes the proper exposure Ei in accordance with the following expression by using the R-, G-, and B-photometric data for the face region extracted by the face extraction circuit 36 in the above manner and the one-frame average density Di (i=any one of R, G, and B) computed by the average density computation circuit 38 and outputs Ei to the driver 42. The driver 42 computes an exposure control value with the proper exposure Ei to control the color modulation filter 16.

$$\log E_i = LM_i \cdot CS_i \cdot (DN_i - D_i) + PB_i + LB_i + MB_i + NB_i + K_1 + K_2 \qquad (8)$$

Where,

LM: Magnification slope coefficient which is previously set in accordance with the enlargement ratio determined by the type of negative and the print size CS: Color slope coefficient prepared for each type of negative, which includes the under- and over-exposure types. It is decided whether the average density of the frame to be printed is under or over the standard negative density before the under- or over-exposure type is selected.

DN: Standard negative density value

D: Average density value of print frame

PB: Correction balance value for standard color paper, which is determined in accordance with the type of the color paper LB: Correction balance value for standard printing lens, which is determined in accordance with the type of the printing lens MB: Correction value (master balance value) for fluctuation of the printing light source or change of paper developing performance NB: Negative balance (color balance) value determined by the characteristic of negative film K2: Color correction value K1: Density correction value shown by the following expression $$K_a \left( \frac{D_R + D_G + D_B}{3} - \frac{FD_R + FD_G + FD_B}{3} \right) + K_b \quad (9)$$

Where, Ka and Kb are a constant and FD is the average density of face region.

It is also possible to express the color correction value K2 by assuming the density correction value K1 in the above expression (8) as the correction value obtained by a film tester and using the average density of face region as shown below.

$$(K_2)_i = K_c \left\{ \left( FD_i - \frac{FD_R + FD_G + FD_B}{3} \right) - \left( DN_i - \frac{DN_R + DN_B + DN_G}{3} \right) \right\} \quad (10)$$

Where, Kc is a constant.

Moreover, it is possible to obtain an exposure by assuming the density correction value K1 and color correction value K2 in the above expression (8) as the correction value obtained by the film tester and replacing the average density Di of the print frame in the expression (8) with the average density FDi of face region.

Because this embodiment makes a judgment by using the contour and internal structure of a region, face data can also be extracted from an image in which a face, ground, and tree having similar hue are mixed.

Figure 9:
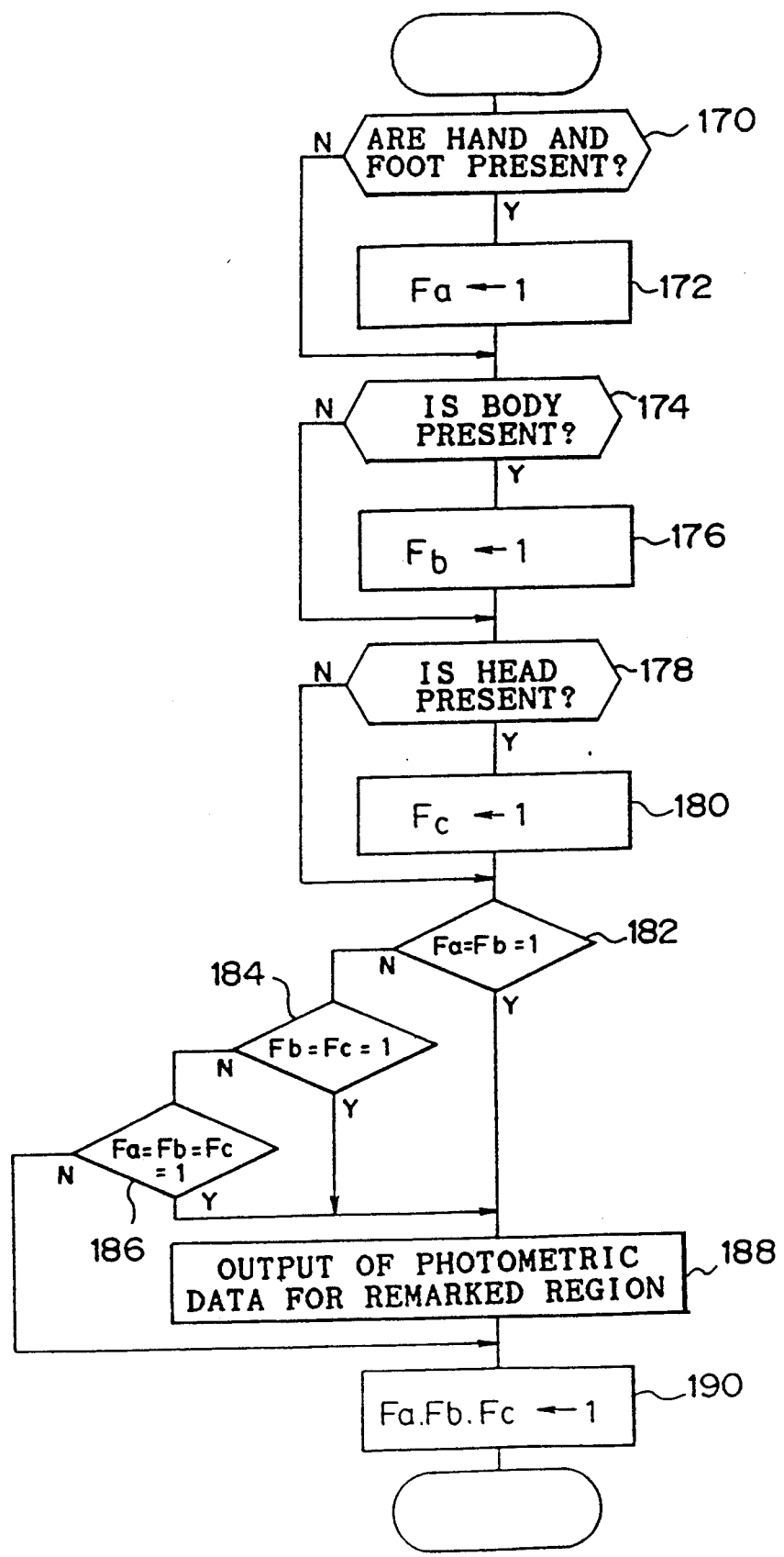
FIG. 9 is a flow chart of the face extraction routine of the second embodiment of the present invention.

The second embodiment of the present invention is described below. This embodiment is made by modifying the method of the first embodiment for judging whether a region includes a face or not, which judges whether the remarked region is a face or not on each prospective region extracted in the step 108 by using the shape and color information of the remarked region and those of adjacent regions which are located around the remarked region. FIG. 9 shows the routine for judging a face or not. In the step 170, it is judged whether or not a region corresponding to the hand or foot of a person is extracted by judging if a region which has the hue value and saturation value same as or close to those of the remarked region around the remarked region and whose size (capable of adopting, for example, horizontal or vertical fillet diameter) is 25 to 100% of that of the remarked region is extracted. The range to be judged should be a range in which the body of a person is present, in order words, a range having the radius five times as large as the diameter of the circle with the same area as that of the remarked region. If image information is discontinued, the objective range should be up to the position where image information is discontinued in the discontinuous direction. When a region corresponding to the hand or foot is present around the remarked region, the flag Fa is set in the step 172.

In the next step 174, it is judged whether or not a region of the body of a person is extracted by judging if a region connected with the remarked region is present and the region corresponds to the body of the person. Because the body of a person is normally symmetric to the axis for the right and left and asymmetric for the top and bottom and connects with his face, it is possible to decide whether or not the region corresponding to the body of the person is present by judging if a region connected with the remarked region is present and it is symmetric to the axis for the right and left and asymmetric for the top and bottom. When the region corresponding to the body of the person is present, the flag Fb is set in the step 176.

In the next step 178, it is decided whether or not a head is present by judging the following conditions. The head is adjacent to a face and shows an approximate ellipse when it is combined with the face. Because a cap, helmet, or hair is normally present on the head, the hue or saturation of the head is different from that of the face.

Therefore, it is possible to decide whether the head is present or not by judging if the ratio of the peripheral length of a region adjacent to the remarked region to the boundary length at the adjacent portion with the remarked region is 30% or more, the roundness when the remarked region is combined with the adjacent region is improved, the saturation value difference or brightness value difference to the hue difference between the hue value of the remarked region and that of the region adjacent to the remarked region is large, and the saturation value or brightness value of the region adjacent to the remarked region is smaller than that of the remarked region. When it is decided that the region corresponding to the head is present, the flag Fc is set in the step 180.

In the step 182, it is judged if the flags Fa and Fb are set. If so, in other words, when a region corresponding to the hand or foot is present around the remarked region and the region connected with the remarked region is a region corresponding to the body, it is decided that the remarked region is a person's face and the R-, G-, and B-photometric data for the remarked region is outputted in the step 188. If not in the step 188, it is judged in the step 184 if the flags Fb and Fc are set. If so, in other words, when the region connected with the remarked region is a region corresponding to the body and the region adjacent to the remarked region is a region corresponding to the head, it is decided that the remarked region is a person's face and the step 188 starts. If not in the step 184, it is judged in the step 186 if the flags Fa, Fb, and Fc are set. If so, it is decided that the remarked region is a person's face and the step 188 starts. In the next step 190, the flags Fa, Fb, and Fc are reset in order to decide the remarked region.

To decide whether the remarked region is a hand, foot, body, or head in this embodiment, it is also possible to previously store a plurality of standard hand or foot images, a plurality of standard body images, and a plurality of standard head images and compare the remarked region with these standard images for decision as described in the above first embodiment.

The third embodiment of the present invention is described below.

Figure 10:
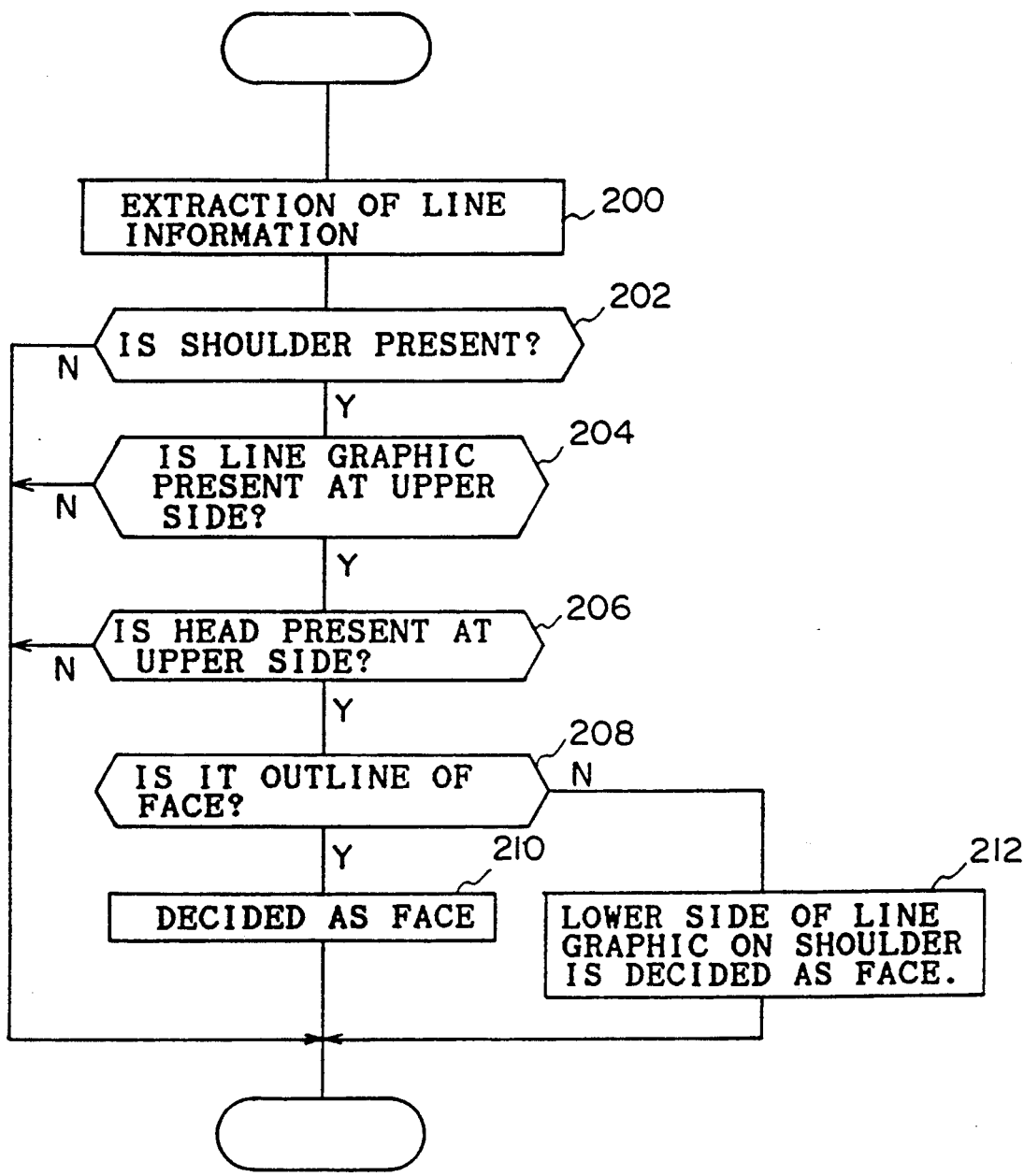
FIG. 10 is a flow chart of the face extraction routine of the third embodiment of the present invention.

This embodiment is made by modifying the method of the first embodiment for judging the presence of a face or not, which converts an extracted region into a line graphic to judge whether or not the remarked region is a face in accordance with the shape of regions around the remarked region and that of the remarked region. FIG. 10 shows a face decision routine in accordance with line graphic conversion, in which each region is converted into a ling graphic by extracting line information from the extracted region for one screen in the above manner. In the step 202, it is judged whether or not a line graphic showing the shoulder of a person is present by comparing the previously stored standard line graphic showing the person's shoulder with the line graphics for one screen. Unless the line graphic showing the should is present, this routine is completed. When the line graphic showing the should is present, it is judged if any line graphic is present on the former line graphic. If so, the latter line graphic is assumed as a remarked line graphic to judge if any line graphic showing a head (e.g. cap, hair, or helmet) is present on the top of the remarked line graphic in the step 206. If so in the step 206, the remarked line graphic has a large probability that the remarked line graphic is a face line graphic because the line graphic showing the face is present at the top of the remarked line graphic and the line graphic showing the shoulder is present at the bottom of the remarked line graphic. Therefore, it is judged in the step 208 if the contour of the remarked line graphic is similar to that of the standard face line graphic. If so in the step 208, it is decided in the step 210 that the remarked line graphic is a face and the R-, G-, and B-photometric data for the region corresponding to the remarked line graphic is outputted. If not in the step 208, however, it is decided in the step 212 that the lower portion of the line graphic at the top of the line graphic showing the shoulder is a face and R-, G-, and B-photometric data for the portion is outputted.

For this embodiment, because a face is decided based on the shape of the remarked region, face data can also be extracted from an image including a face, ground, and tree with similar hue. Moreover, because a face is not decided by using the microstructure of the face, the face can be decided with a short computation time even if the resolution of the image to be decided is low.

The fourth embodiment of the present invention is described below in detail. This embodiment is made by modifying the contents of the step 110 of the first embodiment in FIG. 2, which further divides the color region extracted as a prospect of a face in the step 110 into circular or elliptic regions to divide at least the face region from other regions, estimates the face region in accordance with the divided regions, and outputs R-, G, and B-photometric data of the region estimated as a face.

FIG. 11 shows the details of the step 110 of this embodiment. FIG. 11 is explained by using an image in FIG. 12A covering a wide range of a color region with the color same as or similar to a face.

Figure 12A:
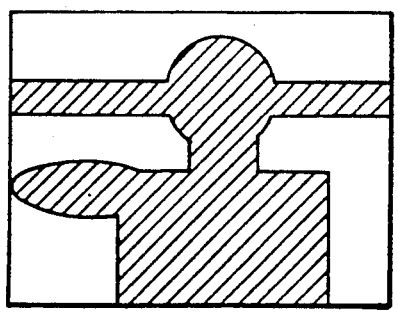
FIG. 12A to FIG. 12G are diagrams showing the processes for dividing the color region of the fourth embodiment.
Figure 12B:
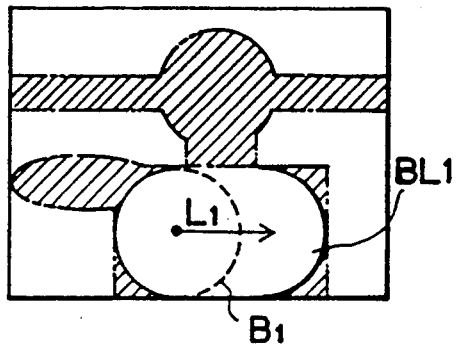
Figure 12C:
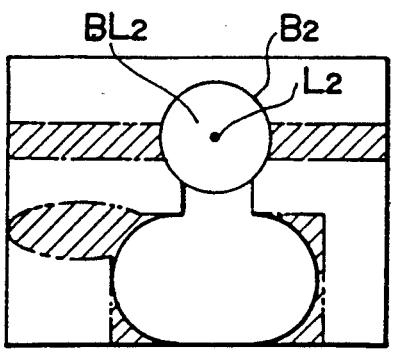
Figure 12D:
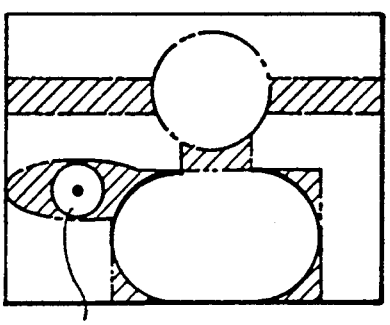
Figure 12E:
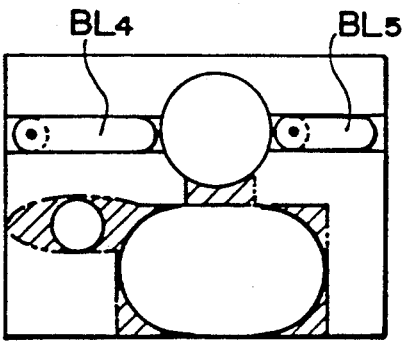
Figure 12F:
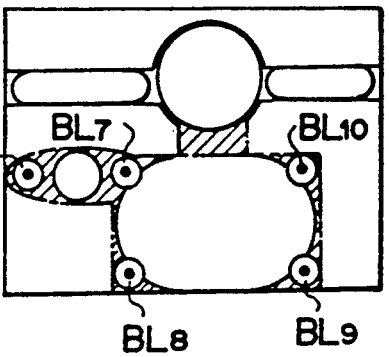
Figure 12G:
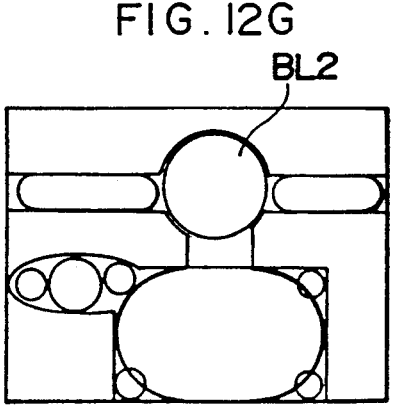

First, in the step 262, one region is selected as a remarked region among the regions extracted by the routine in the step 108 or FIG. 7 (see FIG. 12A). Then, a core for decomposing the selected remarked region is obtained by contracting the remarked region. That is, contraction is repeated to eliminate boundary picture elements of the remarked region and a finally-left point or line region is used as the core. The line region is defined as a plurality of continuous points (picture elements or collection of picture elements) or the line L1 as shown in FIG. 12B. An objective image has the above core or a certain area because it is not the continuous system but the discrete system since it is based on the data obtained by photometrically measuring an original image by the CCD image sensor 28. More than one core may finally be left depending on the shape of the objective image. In this case, the region with the minimum area is determined as the core. When regions with the same area are left, any one of them is selected as the core.

In the next step 264, the largest circle or ellipse inscribed to the remarked region is obtained around the core obtained in the above manner. That is, by performing expansion around the core by the number of times in which contraction is repeated to obtain the core, the core can be obtained as an inscribed circle when it is a point and as an inscribed ellipse when it is a line (morphologic filter).

After the largest circle or ellipse inscribed to the remarked region is obtained, the step 266 starts labeling for attaching a label to the obtained largest circle (or ellipse consisting of the circle) to identify it. In the next step 268, the region BL1 of the labeled circle or ellipse is masked and the step 270 is started. In the next step 270, it is judged if division of all extracted regions by a circular or elliptic region is completed. If not, the steps 262 through 268 are repeated. Thus, the regions BL1 through BL10 are divided in order by large circles as shown in FIGS. 12B through 12F.

When division of the remarked region is completed, the step 272 starts. In the step 272, at least one of the circles or ellipses divided by the routine of the first embodiment described in FIG. 8 is selected to estimate a face region and R-, G-, and B-photometric data of the region estimated as a face is outputted to the proper exposure computation circuit 40. The proper exposure computation circuit 40 computes the proper exposure Ei in accordance with the expression (8) and the driver 40 controls the color modulation filter 16 in accordance with the computed proper exposure.

Therefore, even if the color region with the same color as a face covers a wide range including regions other than the face, the color region can further be divided at the circular region having a high probability of the face region. Thus, the data only for the face region can be extracted at a high probability from an image including a face, body, hands, ground, and trees with similar hue and saturation.

The above core Li and the inscribed-circle region Xi can be shown by the following set-operation expressions (11) and (12).

$$L_i = (X - X_{i-1}) \ominus B_i \quad (11)$$

$$X_i = L_i \ominus B_i \quad (12)$$

Where, i: 1, 2, ...
X: Divided face region
X'0 = Phi (Null set)
X'i = U Xi (Sum set)
(−): Minkowski's substraction
(+): Minkowski's addition When $X_b = \{a+b | a \; X\}$, the following expressions are effected.

$$X \ominus Y = \bigcap_{b \in Y} X_b$$

$$X \oplus Y = \bigcup_{b \in Y} X_b$$

In this case, the shape Bi for obtaining the inscribed circle of the color region around the core by contracting the color region can be decided by the following expression (13).

$$B_i = n_i B \quad (13)$$
$$= B \oplus B \oplus B \ldots \oplus B$$

Where,

B: Circular component.

The value "ni" in the expression can be decided by the following expression (14).

$$n_i = \frac{M_i}{r_0} \cdot \sqrt{\frac{1}{\pi}} \cdot 0.9^{(k-1)} \quad (14)$$

Where,

K = 1, 2, ...
$M^2 i$ = Area - - -
Area (X): Area of X region.

The value "ni" for a size to be decomposed can be decided by properly selecting the value of "k". The following expression (15) can be used instead of the above expression (14).

$$n_i = \frac{M_i}{r_0} = \sqrt{\frac{1}{\pi}} - (k-1) \quad (15)$$

Where, k = 1, 2, ...
r0: Radius of component B.

The relationship between the above circular component B and X region can be expressed as follows:

$$X \; (X \ominus B) \oplus B \quad (16)$$

Where,

B = {−b | b  B}
B = B.

Figure 13:
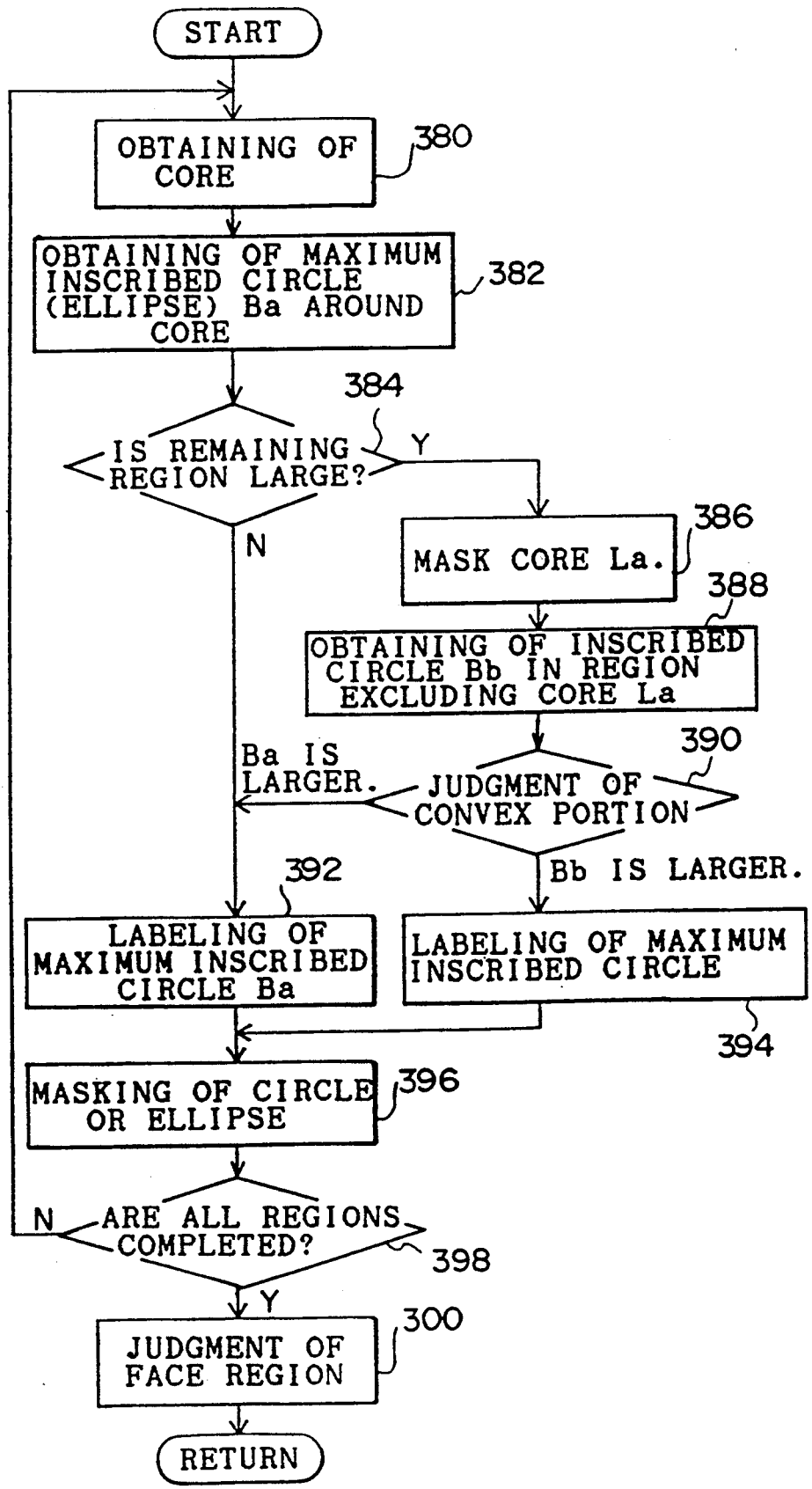
FIG. 13 is a flow chart showing the details of the step 110 of the fifth embodiment.

The fifth embodiment of the present invention is described below by referring to the flow chart shown in FIG. 13.

This embodiment is made by modifying the contents of the step 110 of the first embodiment in FIG. 2, which most preferably divides a face region from a region contacting the face region. That is, the face region in a portrait is present around the body in most cases. Therefore, when a color region including the face region has a plurality of convex regions, the color region is divided from a circular region inscribed to the convex portion and the divided circular region is selected to preferentially divide a prospective region capable of estimating the circular region as the face region.

Figure 14A:
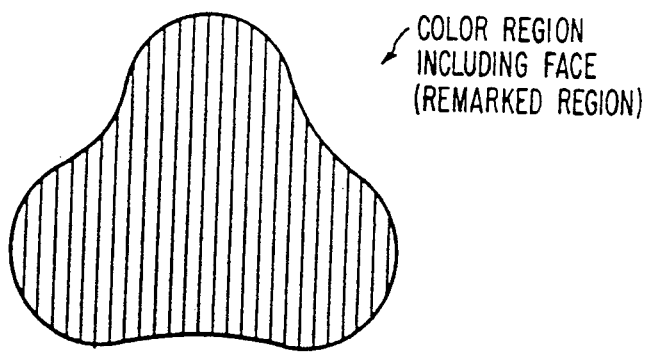
FIG. 14A to FIG. 14D are diagrams showing the processes for dividing the color region of the fourth embodiment.
Figure 14B:
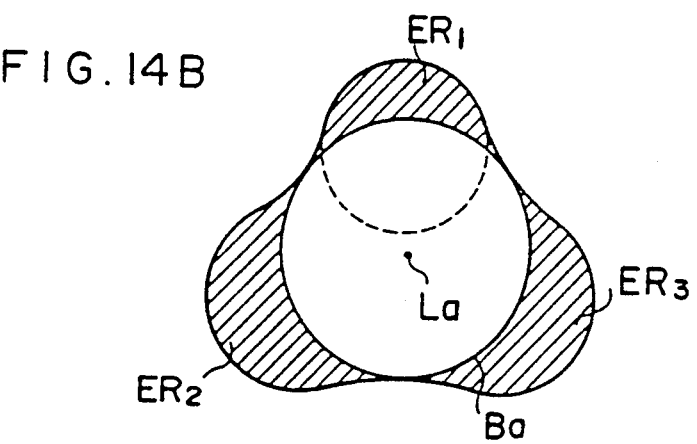

First, in the step 380, one region is selected among the regions extracted by the routine in the step 108 or FIG. 7 (see FIG. 14A). Then, similarly to the fourth embodiment, the selected remarked region is contracted to obtain the core La of the remarked region (see FIG. 14B).

In the next step 382, the largest circle or ellipse Ba inscribed to the remarked region is obtained around the core La obtained in the above manner. In the next step 384, the area of the circle or ellipse inscribed to the remarked region thus obtained with that of the remarked region to judge if the area of the region ERi (i = 1, 2, ...) remaining around the inscribed circle of the remarked region has a predetermined value or more. If so, the step 386 is started because there is a possibility that the convex region is present in the remaining region ERi. If not, the step 392 is started.

Figure 14C:
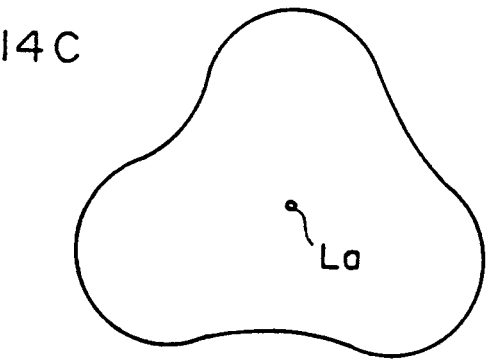
Figure 14D:
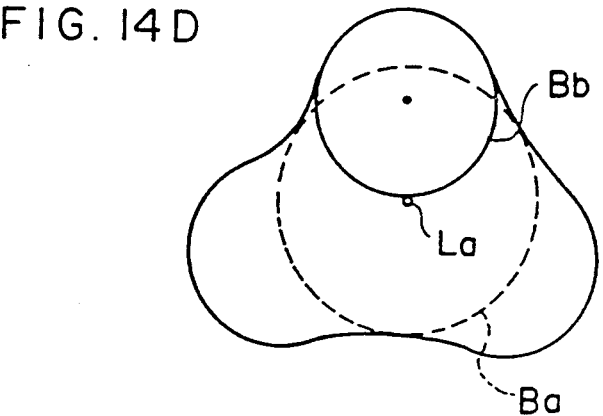

In the step 386, the core La obtained in the above manner is excluded (masked) from the remarked region as shown in FIG. 14C. In the next step 388, contraction and expansion are performed like the above mentioned to obtain the largest circle or ellipse Bb in which the core La is inscribed to the masked remarked region (see FIG. 14D).

In the next step 390, the size of the convex portion outside the remarked color region is judged by expanding each of thus-obtained inscribed circles or ellipses Ba and Bb within the range of approximately predetermined (e.g. 1 through 3) picture elements and judging if the region protruding from the remarked region has the size of predetermined value or more. That is, it is judged that larger region protruding from the remarked region among expanded regions is more convex. When the obtained convex portion has the size of predetermined value or more, the step 394 is started to perform labeling for identifying the inscribed circle or ellipse Bb before the step 396 is started. If the obtained convex portion has the size of predetermined value or less, labeling for identifying the largest circle (or ellipse consisting of the circle) inscribed to the remarked region is performed in the step 392 similarly to the fourth embodiment before the step 396 is started.

In the step 396, the circle or ellipse labeled in the step 392 or 395 is masked. Then, the step 398 is started. In the step 398, it is judged if division of every extracted region by circles or ellipses is completed.

If not, the steps 380 through 398 are repeated. In the next step 300, at least one of the divided circles or ellipses is selected to judge the face region similarly to the first embodiment and R-, G-, and B-photometric data for the region decided as a face is outputted to the proper exposure computation circuit 40.

Thus, because this embodiment preferentially divides a large circular region inscribed to the convex portion around a color region or a circular region having a high probability of a face region from the remarked region, data for the face region can be extracted by more certainly dividing only the face region even for the color region in which the body and face contact each other.

The above embodiment describes a case in which the color region is divided in accordance with a two-dimensional histogram of hue and saturation values. However, this embodiment is not restricted to the case. It is also possible to divide the color region in accordance with a histogram of only hue values. Moreover, the color region can be divided not only by a histogram but by other feature value of an original image.

The following is the description of the sixth embodiment of the present invention. This embodiment is almost the same as the first embodiment. Therefore, description of the corresponding portions is omitted and only different points are described.

FIG. 15 shows a face extraction routine of the face extraction circuit 36 of this embodiment. Because FIG. 15 is the same as FIG. 2, the corresponding portions are provided with the same symbol. In the step 106' in FIG. 15, however, many picture elements are clustered in accordance with the obtained two-dimensional histogram. a screen is divided through clustering, and a prospective region of a person's face is extracted from the divided regions.

For this embodiment, evaluation is performed with a two-dimensional histogram of the entire frame to simplify the description. However, it is also possible to previously specify a region to be evaluated with a two-dimensional histogram before cutting out the region.

Figure 16:
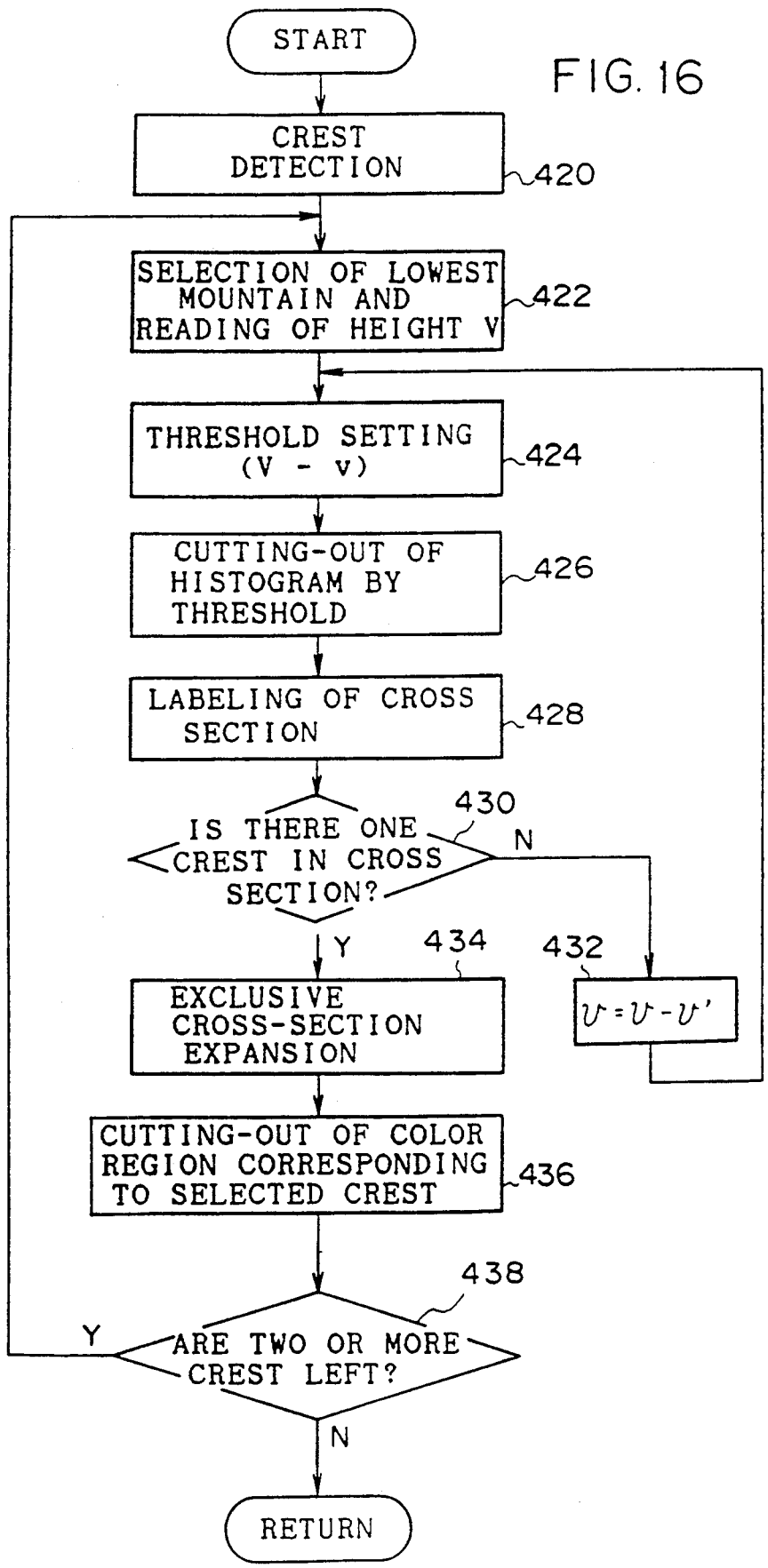
FIG. 16 is a flow chart showing the details of the step 106' in FIG. 15.

The following is the detailed description of the steps 106' through 110 in FIG. 15. FIG. 16 shows the details of the step 106' in FIG. 15. In the step 420, the crest of each mountain of a two-dimensional histogram is detected by slowly and parallely displacing a plane parallel with the coordinate plane consisting of hue- and saturation-value axes.

Figure 17A:
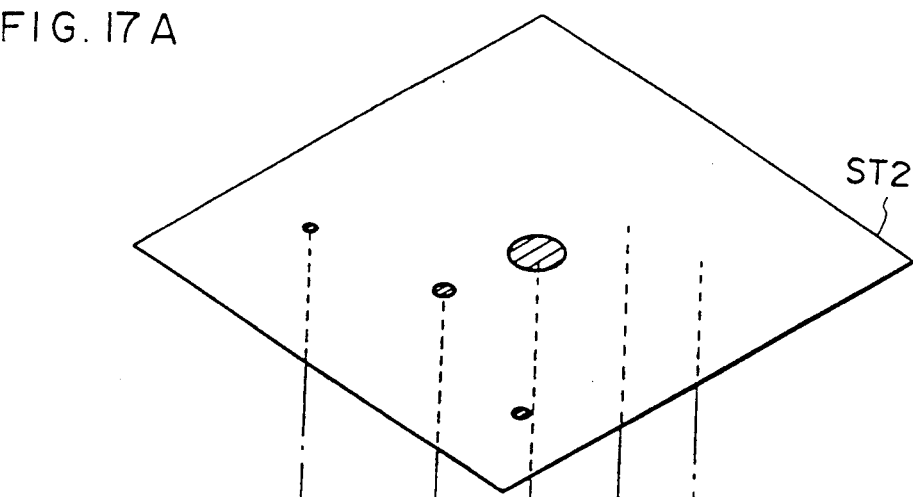
FIG. 17A and FIG. 17B are cross-sectional perspective views showing a plane parallel with the coordinate plane cutting out a two-dimensional histogram.
Figure 17B:
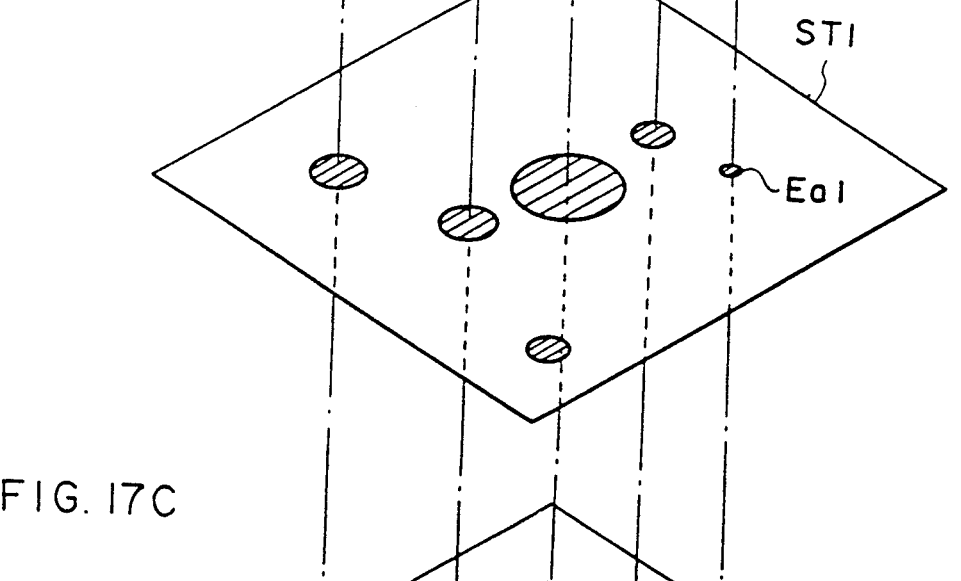
Figure 17C:
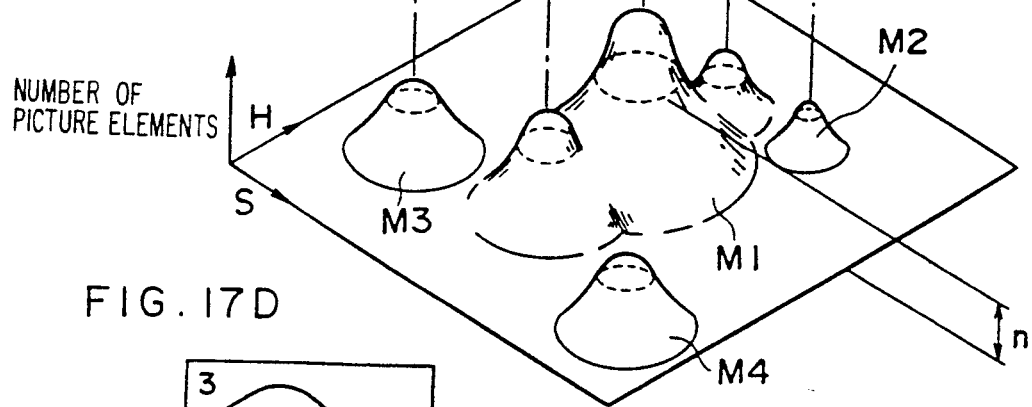
FIG. 17C is a perspective view of a two-dimensional histogram of hue and saturation values.
Figure 17D:
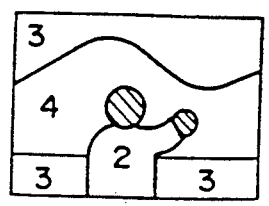
FIG. 17D is a diagram showing the state in which an original image is divided.

First, the plane parallel with the coordinate plane consisting of hue- and saturation-value axes is parallely displaced in the direction in which the number of picture elements increases from 0. In this case, the cross-sectional area of each mountain of the two-dimensional histogram cut out by the plane decreases and comes to 0 at the crest of the mountain. The point where the cross-sectional area comes to 0 is judged as the crest of the mountain. That is, when taking the two-dimensional histogram in FIG. 17C as an example, each closed region which is a cross-sectional region of the mountain sliced by the plane ST1 is present on the plane ST1 (with "n" picture elements) parallel with the coordinate plane consisting of hue- and saturation-value axes as shown in FIG. 17B. For example, the cross-sectional region of the mountain M2 of the two-dimensional histogram corresponds to the closed region Ea1. The region Ea1 disappears on the plane ST2 made by parallely displacing it in the direction in which the number of picture elements increases (positive direction of the number-of-picture element axis). The point where the closed region disappears (or when it comes to 0), is the crest of the mountain M2. The number of crests of a mountain is counted in the above manner. In this case, the height V of the mountain is read by reading the plane height when the crest is detected (i.e. the number of picture elements or frequency). When a plurality of mountains are overlapped, closed regions are divided into each closed region corresponding to a crest by slowly and parallely displacing the parallel plane in the direction in which the number of picture elements increases. It is also possible to displace the plane parallel with the coordinate plane in the direction in which the number of picture elements decreases from the maximum height of the two-dimensional histogram. In this case, the point where a closed region appears (or when the area exceeds 0) is determined as the crest of the mountain. When it is necessary to shorten the processing time, the accuracy is slightly degraded. However, it is also possible to obtain a crest by parallely displacing the plane in stages every predetermined number of picture elements.

Figure 18A:
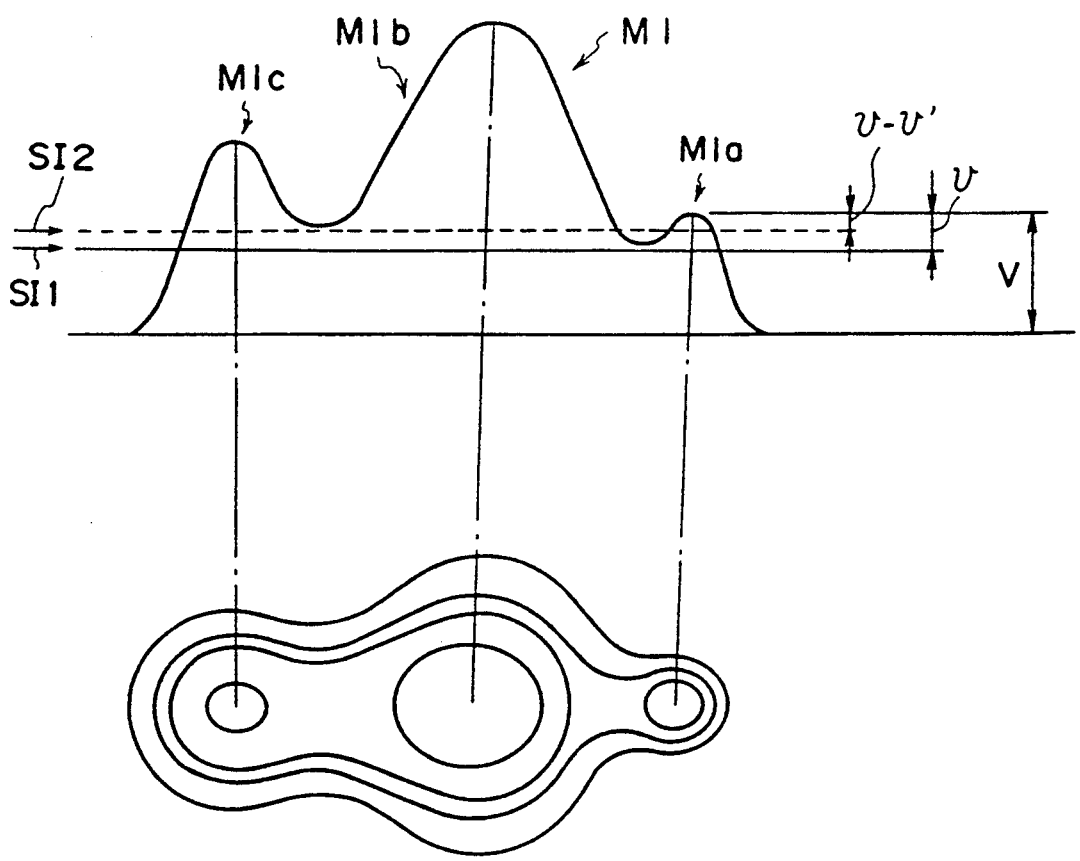
FIG. 18A is side and flat views of a single mountain of a two-dimensional histogram.

In the next step 422, the lowest mountain is selected in a two-dimensional histogram. That is, as shown in FIG. 18A, the lowest mountain M1a is selected in the mountain M1. Then, the height V of the selected mountain is taken in. In this case, a value smaller than the mountain height V (e.g. value "v" which is the predetermined rate of the mountain height V) is obtained. The value "v" can use a previously set value. In the next step 424, the threshold (V−v) for cutting out the selected mountain is set. In the step 426, the two-dimensional histogram is cut out by the plane SI1 determined by the set threshold. Thus, the cross section serves as the closed region Eb1 shown as a hatched area in FIG. 18B. In the step 428, the processing (labeling) for attaching a label to each cross section is performed to identify the cut-out mountain.

Figure 18B:
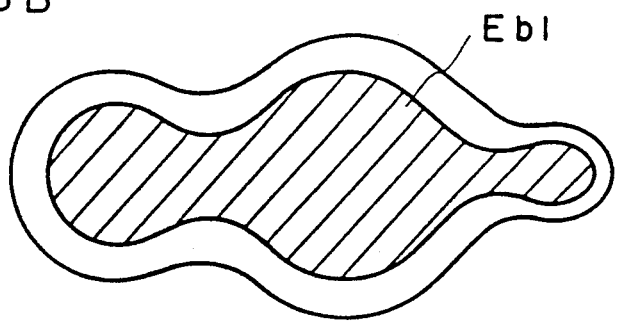
FIG. 18B and FIG. 18C are sectional views of a two-dimensional histogram including the cross section cut out by a plane parallel with a coordinate plane.
Figure 18C:
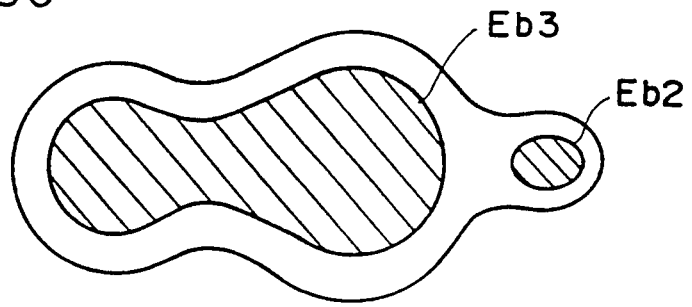

In the next step 430, it is judged if two or more mountain crests correspond to one closed region corresponding to the selected mountain crest (minimum height). That is, as shown in FIG. 18B, not only the crest of the lowest mountain M1a but the crests of the mountain M1b and M1c correspond to the closed region Eb1. Therefore, the crest of each mountain is projected on the close region Eb1 to judge whether or not the projected crest is only the crest of the lowest mountain M1a. Thereby, it is judged if the mountain corresponding to the closed region is only the lowest mountain. If it corresponds to two or more mountains, the value "v" is decreased by "v'" (v=v−v') before the step 424 is restarted. Thus, the threshold and the plane height for cutting out a mountain increase. Because of increase of the plane height, the closed region Eb1 is divided into the closed regions Eb2 and Eb3 as shown in FIG. 18C. Thus, only the crest of the lowest mountain corresponds to the close region Eb2. Also, the plane from which the closed region Eb2 corresponding to only the lowest mountain M1a is obtained is determined as a feature plane. The value "v'" is set so that it will be smaller than the value "v". Thus, the steps 424 through 430 are repeated until the crest of the lowest mountain corresponds to a cross section one by one.

Figure 19A:
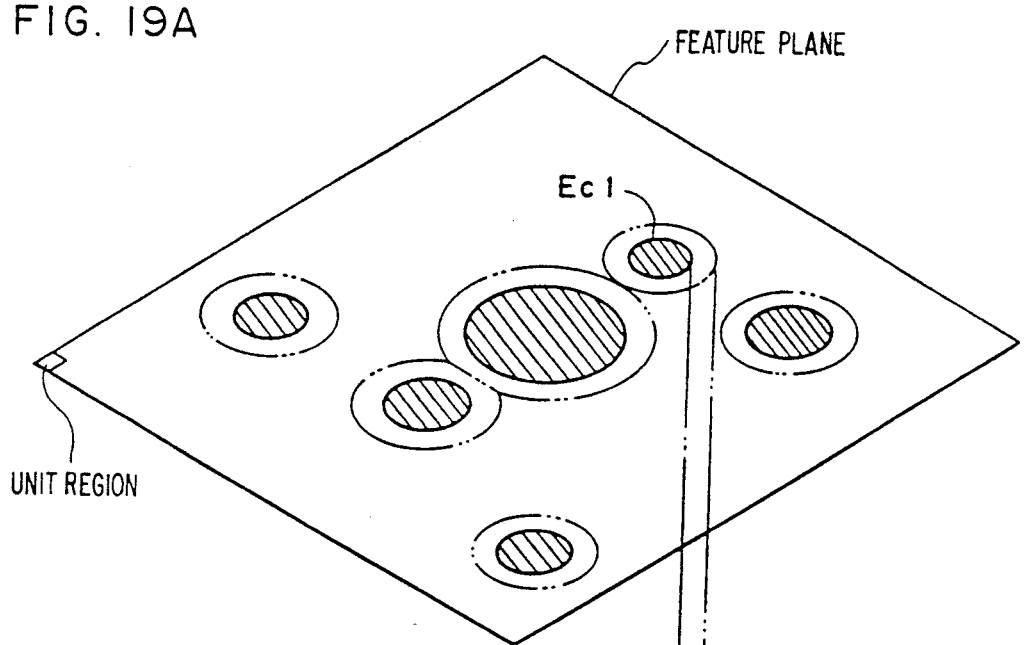
FIG. 19A is a perspective view of a feature plane.
Figure 19B:
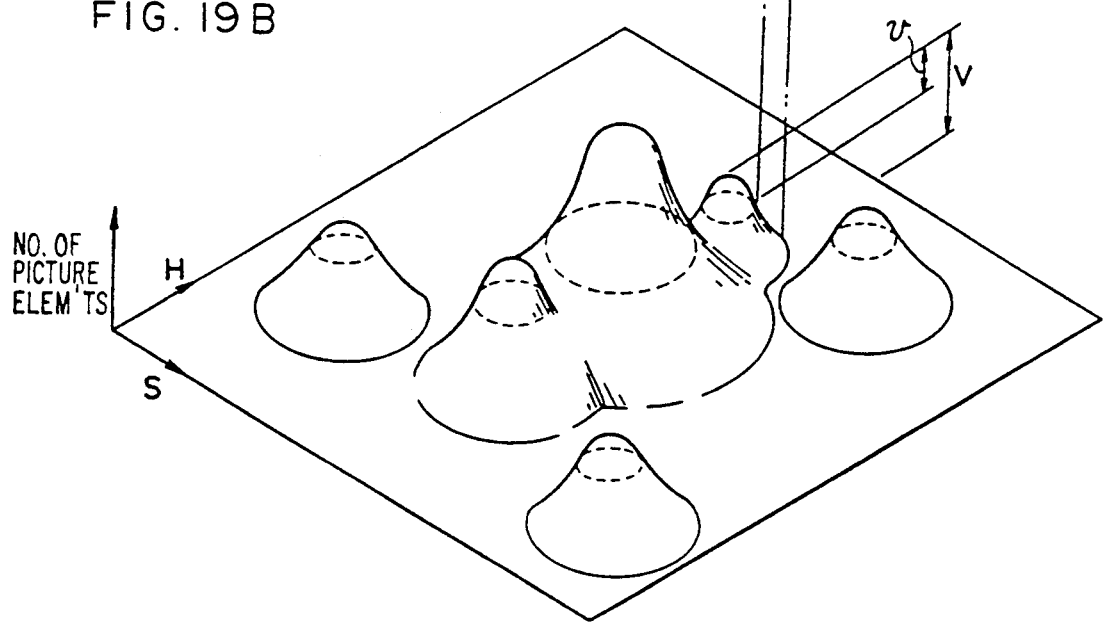
FIG. 19B is a perspective view of a two-dimensional histogram.

In the step 434, exclusive expansion is performed for all closed regions of the cross-sectional portion of the two-dimensional histogram on the plane (feature plane) in accordance with the threshold of the lowest mountain. The exclusive expansion is described below by referring to FIG. 19. First, the feature plane is divided into a plurality of planes by the unit region consisting of the predetermined hue and saturation values. Then, all unit regions of the closed region (hatched portion in FIG. 19) of the cross-sectional portion of the two-dimensional histogram cut out by the feature plane are provided with the density value "1" and unit regions belonging to regions other than the above are provided with the density value "0". Then, the unit regions provided with the density value "0" are exclusively expanded so that their density value comes to "1". The exclusive expansion is performed from the circumferential region (boundary portion) of each cross section.

For example, to perform evaluation by the 8-vicinity technique, an evaluation region having the size of the 3×3 unit region is used as the region for evaluating unit regions provided with the density value "0". Then, the unit region to be evaluated is set to the center of the evaluation region.

When a unit region provided with the density value "1" is present in eight regions around the evaluation region, the unit region to be evaluated is provided with the density value "1". The area of the closed region is expanded by applying the above processing to all unit regions provided with the density value "0" on the feature plane. All closed regions on the feature plane are expanded by repeating the above processing. Expansion is completed when the interval between the boundaries of close regions comes to a predetermined value (e.g. one-unit region). That is, the unit region in which the interval between the boundaries of closed regions equals the predetermined value is determined as the density value "0". Thus, even if a plurality of crests correspond to one mountain, expansion can be performed by assuming the portion up to the trough of the mountain as a boundary. Moreover, to evaluate unit regions provided with the density value "0" by the above evaluation region, the obtained two-dimensional histogram is referenced to read the number of picture elements in the unit region to be evaluated in the two-dimensional histogram. When the read number of picture elements is one or less, exclusive expansion is not performed because expansion is unnecessary. Therefore, the contour of the mountain can be obtained by the obtained trough and foot of the mountain.

As described above, a two-dimensional histogram can be divided into mountains with one crest by performing exclusive expansion and obtaining the contour of mountains.

In the next step 436, the color region of an original image corresponding to a selected crest is cut out. That is, the original image corresponding to the hue- and saturation-value ranges obtained through the above exclusive expansion is divided and cut out. In the step 438, it is judged if any crest remains. If two or more crests remain, the step 422 is restarted. When cutting out of color regions of the original image corresponding to all crests is completed, this routine is completed. When one crest remains, the processing (labeling) for attaching a label to a cross section is performed without repeating the above processing because the hue- and saturation-value ranges are already obtained and the next processing is started. All color regions of the original image can be divided and cut out by repeating the processing for dividing and cutting the original image.

Thus, the original image can easily be divided even if it is clustered into complex shapes because the crests of mountains of a two-dimensional histogram are detected, mountains of the two-dimensional histogram are cut out by corresponding to the crests, the cut-out cross sections are exclusively expanded, and the two-dimensional histogram is divided by the expanded cross sections.

The above mentioned is the description of the case in which division of the two-dimensional histogram and division and cutting-out of the original image are performed for each cross section. However, it is also possible to completely divide the two-dimensional histogram before cutting out the original image.

To judge whether or not the remarked region is a face, this embodiment can use the judging methods described in the second, third, fourth, and fifth embodiments in addition to the judging method using the contour and internal structure of the region described in the first embodiment.

The following is the description of the seventh embodiment. This embodiment is made by modifying the steps 106 and 108 in FIG. 2 of the first embodiment, which detects the shape of mountains by small mountains cut out by a plane parallel with a coordinate plane for each mountain of an obtained two-dimensional histogram to cluster the two-dimensional histogram. This embodiment is described below by referring to the drawings used for the sixth embodiment.

Figure 20:
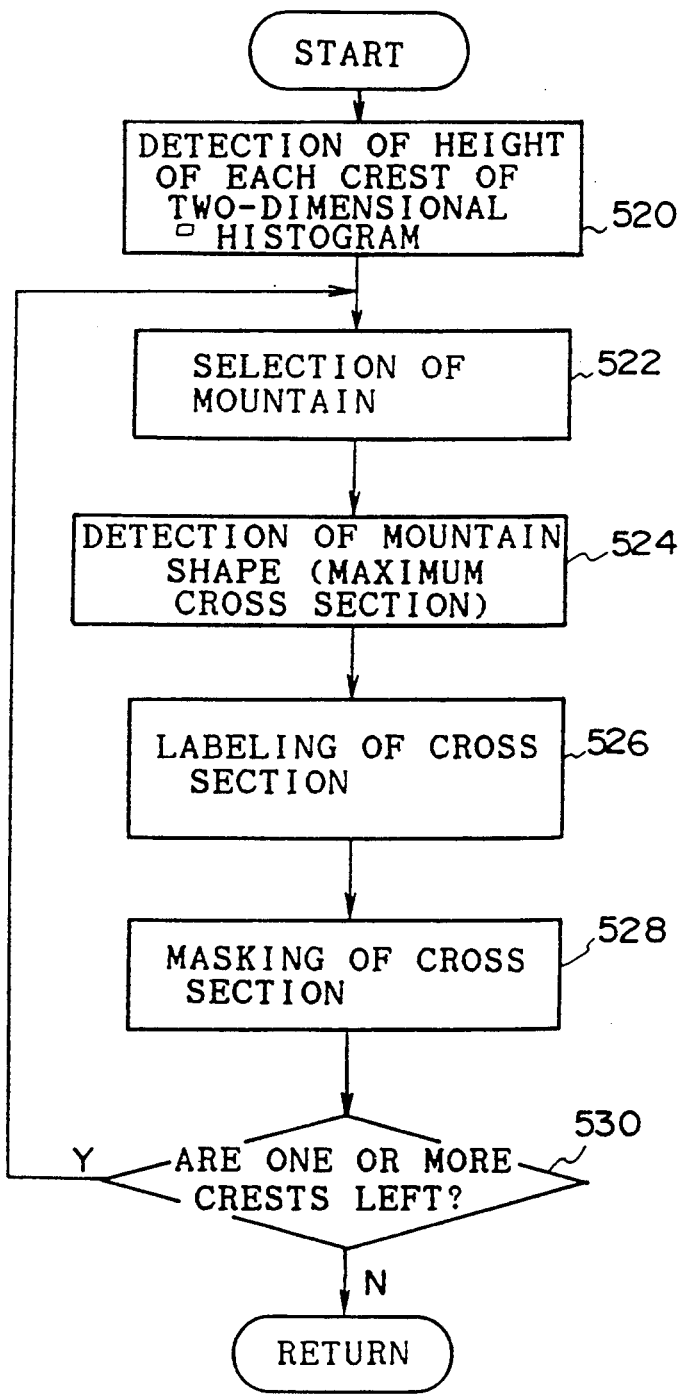
FIG. 20 is a flow chart showing the details of the step 106 of the seventh embodiment.

FIG. 20 shows the details of the step 106 of this embodiment. In the step 520, the crest of each mountain of a two-dimensional histogram is detected by slowly and parallely displacing a plane parallel with the coordinate plane consisting of hue- and saturation-value axes. First, the plane parallel with the coordinate plane consisting of hue- and saturation-value axes is parallely displaced in the direction in which the number of picture elements increases from 0. In this case, the cross-sectional area of each mountain of the two-dimensional histogram cut out by the plane decreases and comes to 0 at the crest of mountain. The point where the cross-sectional area comes to 0 is judged as a crest of mountain. That is, when taking the two-dimensional histogram in FIG. 17C as an example, each closed region which is a cross section of the mountain sliced by the plane ST1 is present on the plane ST1 (with "n" picture elements) parallel with the coordinate plane consisting of hue- and saturation-value axes as shown in FIG. 17B. For example, the mountain M2 of the two-dimensional histogram corresponds to the closed region Ea1. The region Ea1 disappears on the plane ST2 made by parallely displacing it in the direction in which the number of picture elements increases. The point where the closed region disappears (or when it comes to 0) is assumed as the crest of the mountain M2 to count the number of crests of a mountain. In this case, the height V of the mountain is read by reading the plane height when the crest is detected (i.e. the number of picture elements or frequency). When a plurality of mountains are overlapped, closed regions are divided into each closed region corresponding to a crest by slowly and parallely displacing the plane in the direction in which the number of picture elements increases. It is also possible to parallely displace the plane parallel with the coordinate plane in the direction in which the number of picture elements decreases from the maximum height of the two-dimensional histogram. In this case, the point where a closed region appears (or when the area exceeds 0) is determined as the crest of the mountain. When it is necessary to shorten the processing time, the accuracy is slightly degraded. However, it is also possible to obtain a crest by parallely displacing the plane in stages every predetermined number of picture elements.

Figure 21A:
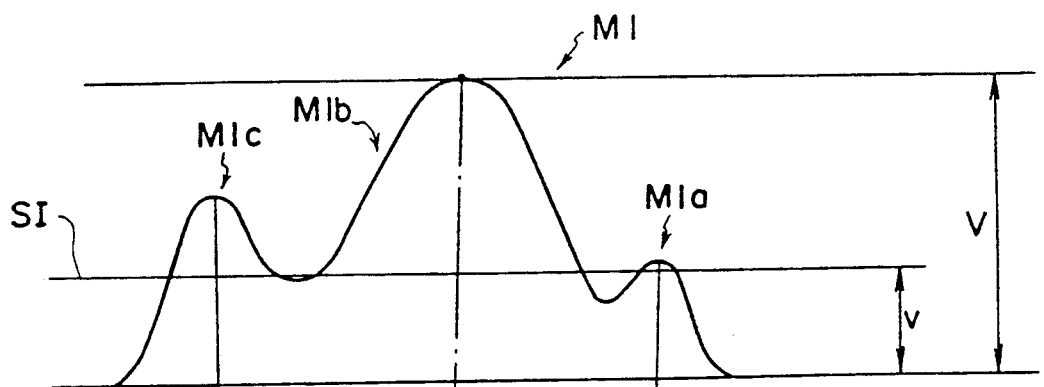
FIG. 21A is a side view of a single mountain of a two-dimensional histogram.
Figure 21B:
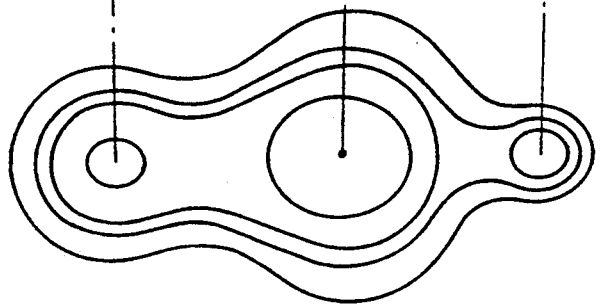
FIG. 21B is a flat view of FIG. 21A.
Figure 21C:
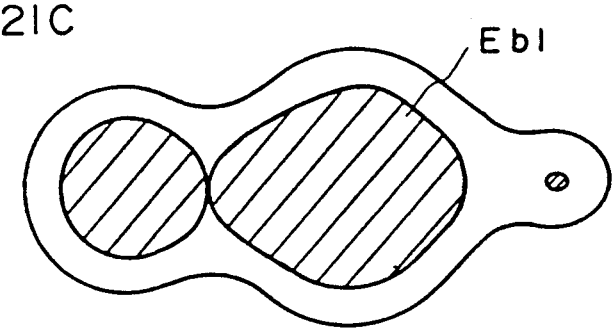
FIG. 21C is a sectional view of a two-dimensional histogram including the cross section cut out by the plane parallel with a coordinate plane.

In the next step 522, a remarked mountain is selected in the two-dimensional histogram and the height of the mountain is taken in. Though the remarked mountain can be any one of the mountains of the two-dimensional histogram, the mountain M1 (FIG. 21) including the highest mountain M1b is selected for this embodiment. In the next step 524, the maximum cross section corresponding to only the crest of the remarked mountain is obtained. To obtain the maximum cross section, as shown in FIG. 21A., the feature plane SI determined by the height V of the highest mountain M1b in the mountain M1 is slowly and parallely displaced in the direction in which the mountain height decreases. The height for parallely displacing the feature plane is determined by the threshold "v". The threshold "v" decreases from the mountain height V at the predetermined rate. The value decreasing at this predetermined rate can use a pre-set value. The two-dimensional histogram is cut out by the feature plane SI determined by the threshold "v". Parallel displacement of the feature plane is completed when the interval between the boundaries of the remarked closed region and other closed region reaches a predetermined value. Thus, when a plurality of mountains are overlapped, it is possible to obtain the maximum cross section assuming the portion up to the trough as a boundary. Moreover, parallel displacement is completed also when the threshold which is the height of the above plane decreases to a predetermined value (e.g. one picture element value) or less. Therefore, the maximum cross section up to the foot of a mountain with one crest can be obtained. Thus, the cross section corresponding to the highest mountain M1b comes to the closed region Eb1 which is shown as the hatched portion in FIG. 21C.

In the step 526, the processing (labeling) for attaching a label to the cross section of the remarked mountain is performed to identify the cut-out mountain. In the next step 528, the labeled mountain is masked to judge in the step 530 if any crest remains. If so, the step 522 is restarted. Then, the above steps are repeated to divide all regions of the two-dimensional histogram of hue and saturation values into small mountains with one crest.

FIG. 22 shows the details of the step 108 in FIG. 2. In the step 632, the picture elements of an original image expressing the features of small mountains corresponding to each cross section are obtained as a core picture element in accordance with hue and saturation values within the hue-and saturation-value ranges of each cross section of a two-dimensional histogram on the feature plane specified by the threshold "v" of each mountain for obtaining the maximum cross section. This embodiment uses the picture elements on the original image corresponding to hue and saturation values including many picture elements (of mountain crest) in the mountain cut out by the feature plane specified by the threshold of each mountain (see symbols Z1 through Z6 in FIG. 23B). More than one core picture element may be present on the original image corresponding to hue and saturation values of the crest of one mountain of a two-dimensional histogram. However, this embodiment uses one typical picture element (e.g. picture element at the position determined by an average value) as the core picture element corresponding to the crest of one mountain. It is also possible to obtain the hue and saturation values of the core picture element Z by computing the average values of hue and saturation values within the hue- and saturation-value ranges of the cross section on the feature plane of each mountain.

Figure 23A:
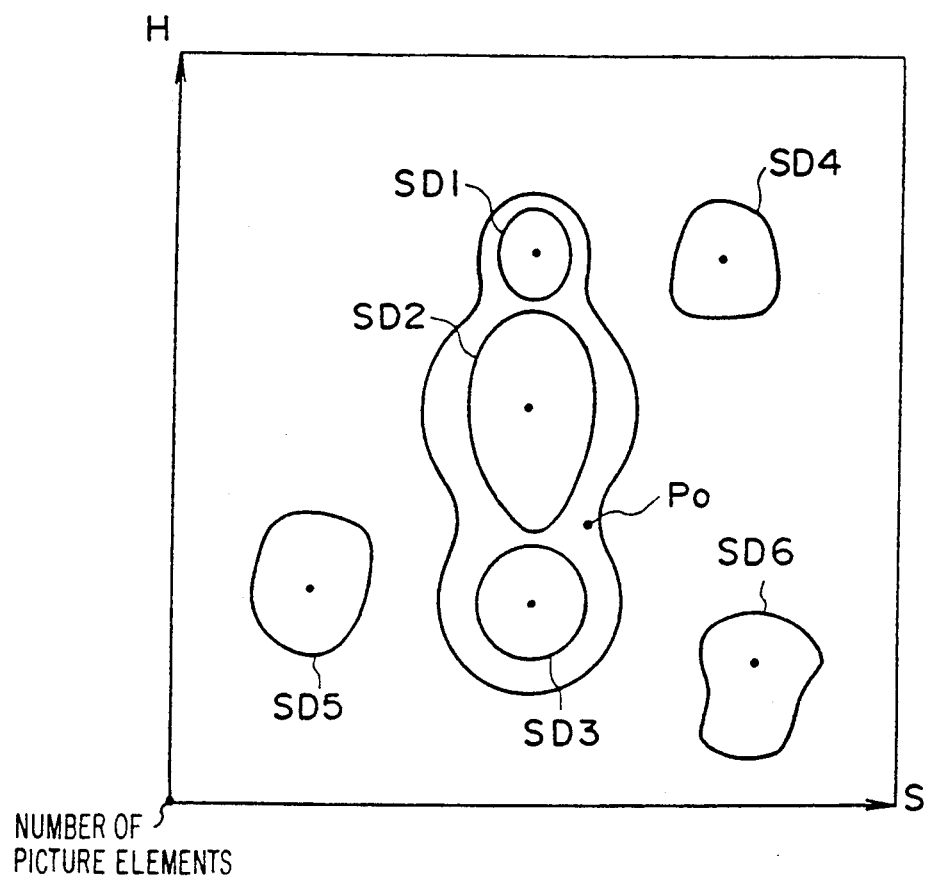
FIG. 23A is a flat view of the cross sectional region of each mountain of a two-dimensional histogram.
Figure 23B:
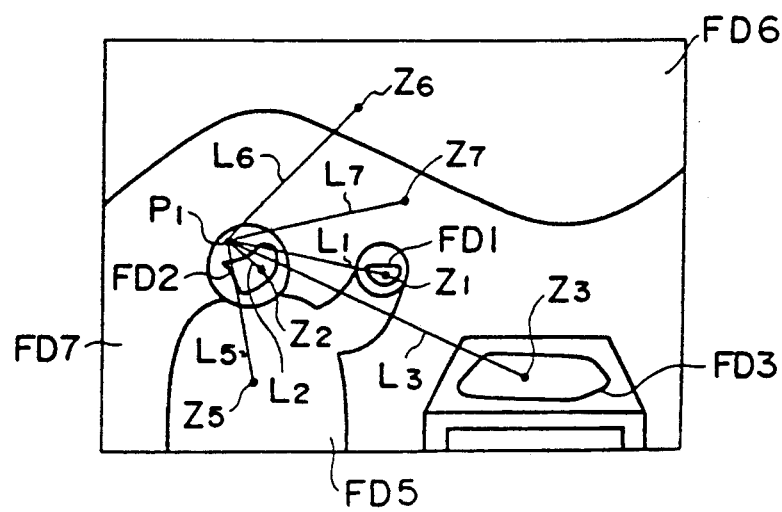
FIG. 23B is a diagram showing clustered cross section of each mountain and the core picture element of each mountain in an original image.

In the next step 634, first, it is judged if the hue and saturation values of each picture element of the original image belong to the range of the above obtained cross section and picture elements are clustered to each color region. FIG. 23B shows an example in which an original image is divided and the picture elements of each region provided with symbols FD1 through FD6 correspond to the picture elements included in the cross sections provided with symbols SD1 through SD6 of each mountain. Then, the picture element (picture element to be unified) P1 other than the picture elements clustered on the original image is selected. The picture element P1 corresponds to the point P1 shown in FIG. 23A on the two-dimensional histogram.

In the next step 636, the distances L1 through L6 between the core picture elements Z1 through Z6 and the picture element P1 to be unified are obtained on the original image and the label MD1 is given to the mountain corresponding to the core picture element Z2 having the minimum distance L2 among these obtained distances L so that it will be identified as the mountain M1b as shown in FIG. 23B. In the next step 638, the degree of similarity between each of the core picture elements Z1 through Z6 and the picture element P1 to be unified is obtained on the original image and the labels MD2 and MD3 are given to the mountain corresponding to the core picture elements Z with the highest degree of similarity and the next mountain so that the former can be discriminated from the latter.

The similarity between the core picture element and the picture element to be unified is judged by the number of and hue and saturation values of the picture elements included in the small mountains (cross sections) of the two-dimensional histogram corresponding to the core picture elements Z. For example, the degree of similarity can be judged by the T-value obtained through the T-test of the expression (17) shown below. The degree of similarity between the picture element to be unified and the mountain corresponding to the core picture element increases as the T-value obtained through the T-test decreases. Therefore, it is preferable to unify picture elements with a mountain having smaller T-value. It is also possible to obtain the degree of similarity by other method without using the T-test. For example, comparison with the picture element to be unified can be made through statistical processing in accordance with the average value of hue and saturation values of the picture element corresponding to each mountain, the shape (distribution of two-dimensional histogram) of each mountain, the number of picture elements of each mountain.

$$T = \sqrt{\frac{(N-1) \cdot N}{(N+1)}} \cdot (y - xm)^2 / S_2 \tag{17}$$

Where,
- N: Number of picture elements corresponding to cut-out mountains
- S2: Variance of picture elements corresponding to cut-out mountains on feature plane
- y: Average of picture elements corresponding to cut-out mountains on feature plane
- xm: Average of picture elements to be unified.

Picture elements to be unified are unified to the mountain with a small distance and high degree of similarity on the original image by the obtained distance L and T-value indicating degree of similarity on the obtained original image. In this case, it is more certain to unify similar picture elements on the color original image to a group corresponding to the mountain corresponding to a near core picture element. For example, the shaded portion (hatched portion Cx) of a face and the portion of the tree (hatched portion Tx) having hue and saturation values similar to the shaded portion of the face shown in FIG. 24A may come to a region (Ar) close to the trough where a plurality of mountains are overlapped on the two-dimensional histogram as shown in FIGS. 24B and 24C. Therefore, it is not clear whether the unified picture element Pz included in the region Ar belongs to the mountain corresponding to the face portion (Cp) or that corresponding to the tree portion (Tp).

Figure 24A:
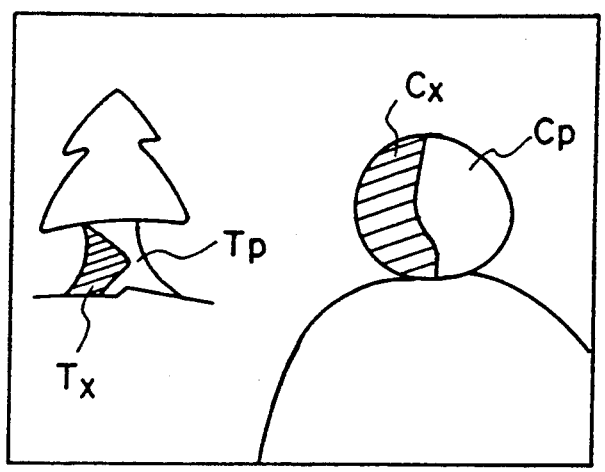
FIG. 24A is a diagram of an original image.
Figure 24B:
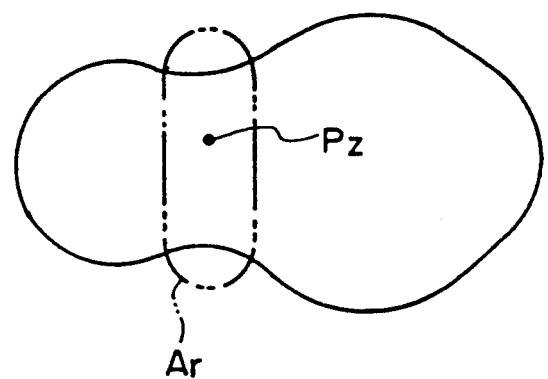
FIG. 24B is a flat view of a two-dimensional histogram.
Figure 24C:
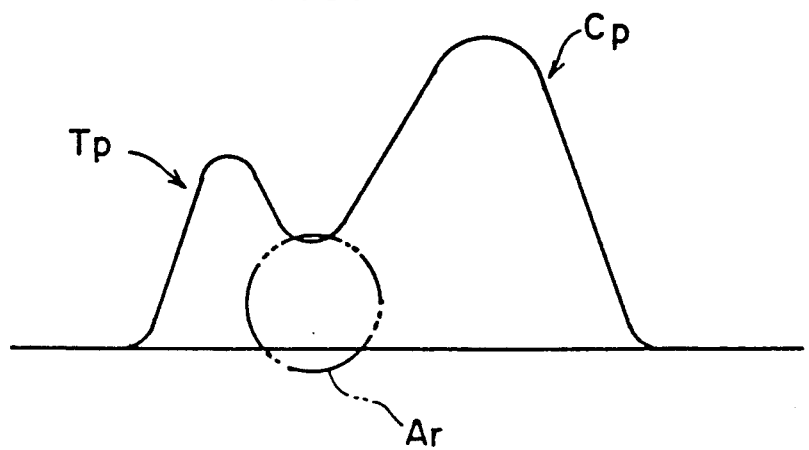
FIG. 24C is a side view of FIG. 24B.

However, as shown in FIG. 24A, the picture elements present on the original image frequently have a high degree of similarity with the region of the image around the picture elements. Therefore, in this case, the original image can be clustered by unifying the picture elements to a mountain belonging to a nearer region on the original image.

Therefore, when the labels MD1 and MD2 are given to the same mountain in accordance with degree of similarity as described above, the picture element P1 to be unified is unified to the color region of the mountain as a picture element included in the mountain provided with the label MD1 in the step 644. When the labels MD1 and MD3 are given to the same mountain, the picture element P1 to be unified is unified to the color region of the mountain as a picture element included in the mountain provided with the label MD1 in the step 648. When the mountain provided with the label MD1 does not coincide with the mountain provided with the label MD2 or MD3, the picture element to be unified is unified preferentially to the color region of the mountain provided with the label MD2 with a high degree of similarity (step 646).

In the next step 650, it is judged if all picture elements are unified. If not, the step 634 is restarted to unify the picture elements of the original image. By repeating unification of the picture elements of the original image, all color regions of the original image can be clustered. When unification of all picture elements is completed, unified color regions of the original image are cut out in the step 652. That is, the original image is divided and cut out so that divided original images will correspond to each hue region obtained through the above unification and this routine is completed.

As above mentioned, the crests of mountains of a two-dimensional histogram are detected, small mountains of the two-dimensional histogram are cut out by corresponding to each crest, the picture elements of the original image are unified in accordance with the cut-out small mountains, and the original image is divided by the unified color region. Thus, an original image can most preferably be divided even if a two-dimensional histogram cannot simply be divided because the shape of each small mountain differs when the two-dimensional histogram has a complex shape in which a plurality of mountains are overlapped.

For this embodiment, the picture elements to be unified are unified to color regions by obtaining the degree of similarity and distance on the original image. However, it is also possible to unify the picture elements to be unified to color regions by obtaining only degree of similarity.

For this embodiment, a case is described in which degree of similarity is obtained by using hue and saturation values. However, it is also possible to obtain degree of similarity in the feature space consisting of hue, saturation, and lightness.

For this embodiment, picture elements are unified each other. However, regions can also be unified each other. In this case, it is preferable to unify the unifying regions by distance and degree of similarity by obtaining core picture elements similarly to the processing of the regions to be unified.

This embodiment can use the judging methods described in the second, third, fourth, and fifth embodiments in addition to the judging method using the contour and internal structure of the region described in the first embodiment.

FIG. 25 shows a modification made by applying the present invention to an exposure determination apparatus separated from a printer or printer processor. In FIG. 25, portions corresponding to those in FIG. 1 are provided with the same symbol and their description is omitted. The average density computation circuit 38 is not always necessary. Instead, it is possible to use an integrating transmission-density detection circuit for detecting LATD of the entire screen.

Figure 26:
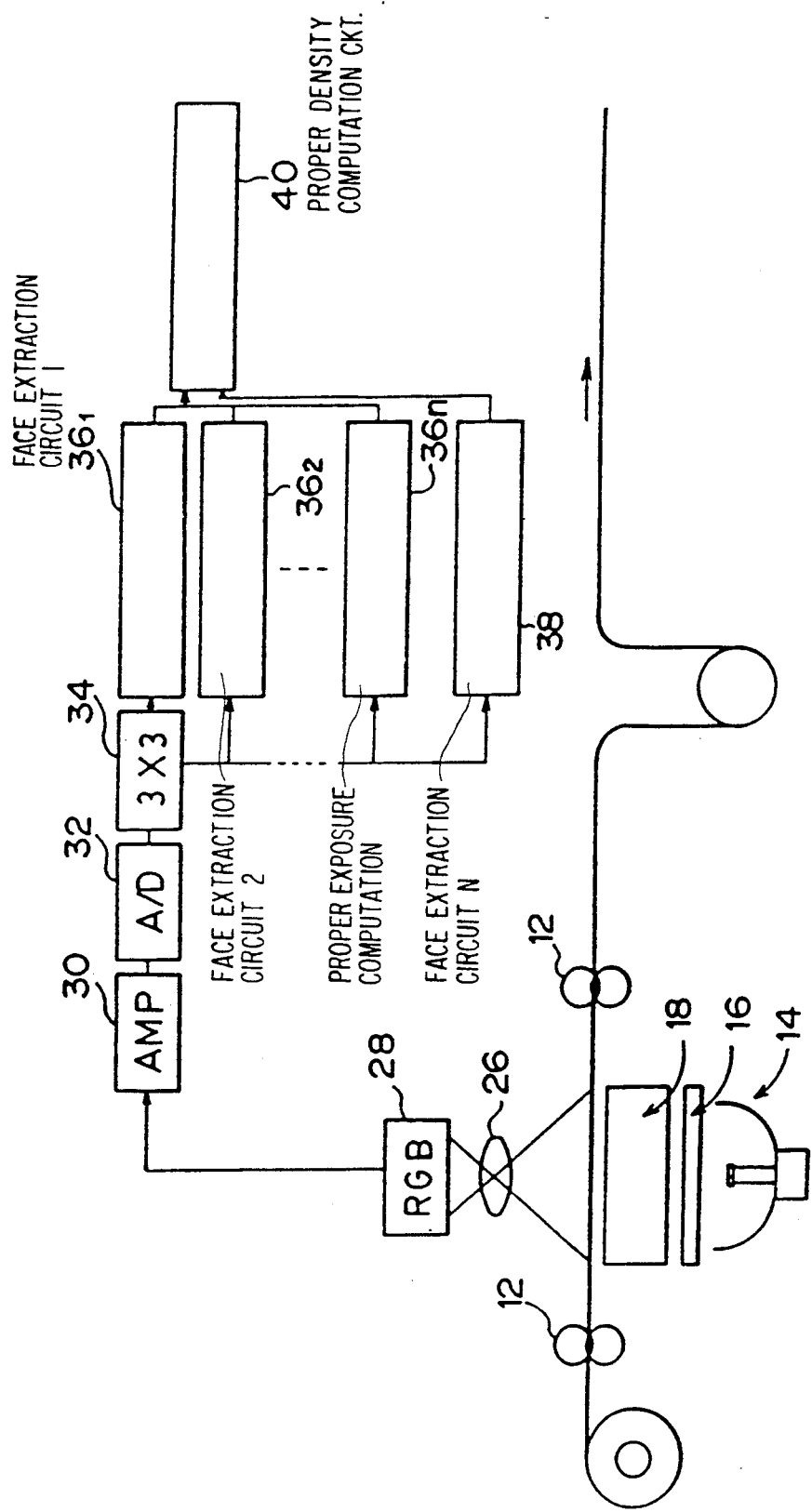
FIG. 26 is a schematic diagram of an exposure computation apparatus for performing parallel processing by a plurality of face extraction circuits.
Figure 27:
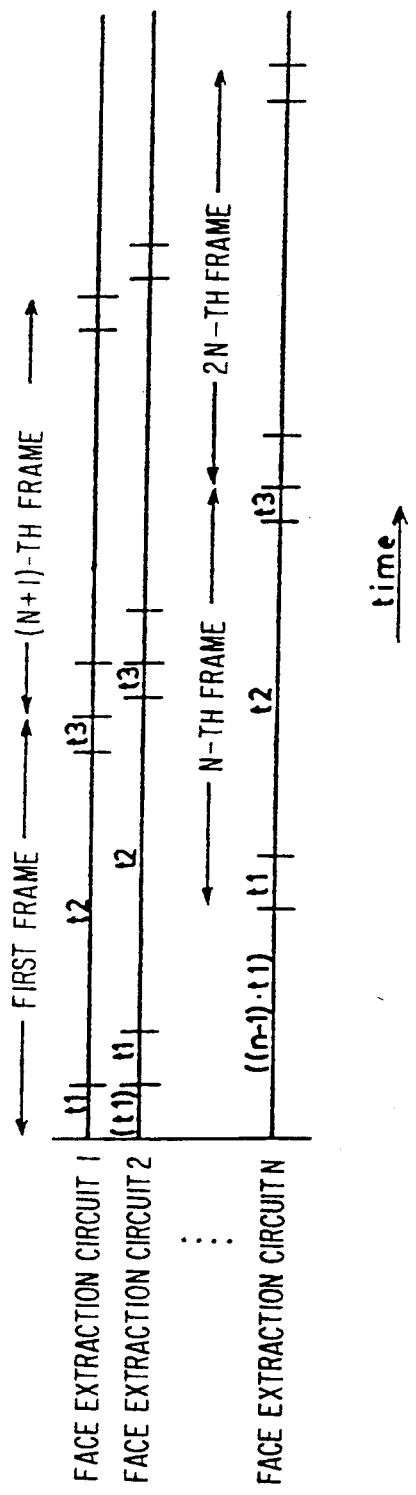
FIG. 27 is a time chart for parallel processing.

FIG. 26 shows a face extraction circuit obtained by constituting the face extraction circuit in FIG. 25 by a plurality of face extraction circuits $36_1$, $36_2$, ... and $36_n$ for computing an exposure through parallel processing. The face extraction circuits $36_1$, $36_2$, ... and $36_n$ read an image in accordance with the time chart in FIG. 27, compute an exposure, and output the computed result. In FIG. 27, t1 is the image read time for one frame, t2 is the exposure computation time for one frame, t3 is the exposure-amount computation result transfer time, where t2>t1 and t2. The face extraction circuit $36_1$ reads images for one frame for the time of t1, computes an exposure for the time of t2, and transfers the computation result for the time of t3. As soon as reading of images for one frame is completed by the face extraction circuit $36_1$, the film is advanced by one frame, reading of images for one frame is started by the face extraction circuit $36_2$, exposure-amount computation by the face extraction circuit $36_1$ and image read by the face extraction circuit $36_2$ are simultaneously performed, and subsequently parallel processing is continued by the face extraction circuits $36_3$, $36_4$, ... and $36_n$.

The time Tp required for the parallel processing of "mxn" frames is shown as follows:

$$Tp = m(t_1 + t_2 + t_3) + (n-1)t_1.$$

The processing time Ts without performing the parallel processing is shown as follows:

$$Ts = m \cdot n(t_1 + t_2 + t_3).$$

Therefore, the speed can be increased by Ts/Tp times. In this case, Ts/Tp is shown as follows:

$$Ts/Tr = \frac{m \cdot n(t_1 + t_2 + t_3)}{m(t_1 + t_2 + t_3) + (n-1)t_1}$$

This parallel-processing system can also be applied to the printer in FIG. 1.

The present invention can also be applied not only to determination of exposure of a photo-printing equipment but to determination of exposure of a digital color printer, determination of copying conditions of a copying machine, determination of exposure of a camera, determination of display conditions of a CRT screen, and determination of exposure when a hard copy is made with magnetic image data.

What is claimed is:

1. A method of extracting feature image data, comprising the steps of:
    (a) dividing a color original image into a plurality of picture elements and resolving each of said picture elements into red, green, and blue colors and photometrically measuring each of said colors;

(b) obtaining a histogram of hue values in accordance with histogram data obtained through the photometry;

(c) dividing the obtained histogram into mountains to produce divided mountains;

(d) determining which of said divided mountains each of said picture elements of the color original image belongs to, classifying said picture elements into a plurality of groups corresponding to the divided mountains, and dividing the color original image into a plurality of divided regions corresponding to each of said groups; and (e) selecting at least one of the divided regions and extracting data from the selected region as feature image data.

2. The method of extracting feature image data according to claim 1, wherein a two-dimensional histogram of hue values and saturation values is obtained in accordance with the histogram data obtained through photometry in said step (b) and the obtained two-dimensional histogram is divided into mountains in said step (c).

3. The method of extracting feature image data according to claim 1, wherein said step (e) further comprises the step of determining whether each divided region includes a person's face or not when selecting said at least one of said divided regions so as to permit said selected region including the person's face to be selected.

4. The method of extracting feature image data according to claim 2, wherein said step (e) further comprises the step of determining whether each divided region includes a person's face or not when selecting said at least one of said divided regions so as to permit said selected region including the person's face to be selected.

5. A method of extracting feature image data, comprising the steps of:

(a) dividing a color original image into a plurality of picture elements and resolving each of said picture elements into red, green, and blue colors, wherein each color is photometrically measured;

(b) obtaining a two-dimensional histogram of hue and saturation values in accordance with the data obtained through the photometry;

(c) cutting the two-dimensional histogram by a feature plane parallel with a coordinate plane, including a cross section corresponding to the crest of a certain mountain of the obtained two-dimensional histogram, and also including hue- and saturation-value axes of the two-dimensional histogram to obtain the cross sections of the two-dimensional histograms;

(d) expanding each cross section until the interval between boundaries of adjacent cross sections on the feature plane decreases in a predetermined value or less, or performing exclusive expansion for expanding cross sections until the frequency of cross-sectional boundaries decreases to a minimum value or a predetermined value close to the minimum value or less, to divide every mountain of the two-dimensional histogram at cross-sectional boundaries after exclusive expansion;

(e) determining which divided mountain each picture element of the color original image belongs to in order to divide picture elements into groups corresponding to the respective divided mountains and dividing the color original image into a plurality of divided regions corresponding to said groups; and (f) selecting at least one of the divided regions to extract the data for the selected region as feature image data.

6. The method of extracting feature image data according to claim 5, wherein said step (f) further comprises the step of determining whether each divided region includes a person's face or not when selecting said at least one of said divided regions so as to permit said selected region including the person's face to be selected.

7. A method of extracting feature image data, comprising the steps of:

(a) dividing a color original image into a plurality of picture elements and resolving each picture element into red, green, and blue colors, wherein each of said colors is photometrically measured;

(b) obtaining a two-dimensional histogram of hue and saturation values in accordance with data obtained through the photometry and dividing the histogram into mountains;

(c) dividing each mountain of the obtained two-dimensional histogram into a plurality of small mountains each with one crest, respectively, by a feature plane which is parallel with a coordinate plane including hue- and saturation-value axes of the two-dimensional histogram and includes the largest cross section corresponding to only the crest of one of said small mountains;

(d) determining which of said small mountains each picture element of the color original image is included in to classify the picture elements into groups corresponding to each of said small mountains;

(e) obtaining degree of similarity between at least one picture element included in each of said small mountains and picture elements excluded from said small mountains for each small mountain in accordance with hue and saturation values;

(f) unifying the picture elements excluded from said small mountain into unified groups corresponding to each small mountain with a high degree of similarity;

(g) dividing the color original image into a plurality of divided regions corresponding to each of said unified groups; and (h) selecting at least one of the divided regions to extract the data for the selected region as feature image data.

8. The method of extracting feature image data according to claim 7, wherein said step (d) further comprises the step of determining which of said small mountains each picture element of the color original image is included in to classify the picture elements into groups corresponding to each of said small mountains and to obtain a plurality of core picture elements of the color original image corresponding to the crest of each small mountain, and wherein said step (e) further comprises the step of determining, based on the color original image, whether or not the distance between each of the picture elements excluded from said small mountains and each of the obtained core picture elements is a minimum to obtain the degree of similarity between at least one picture element included in each small mountain and the picture elements excluded from said small mountain for each of said small mountains.

9. The method of extracting feature image data according to claim 7, wherein said step (d) further comprises the step of determining which of said small mountains each picture element of the color original image is included in to classify the picture elements into groups corresponding to each small mountain and to obtain a plurality of core picture elements of the color image corresponding to the crest of each small mountain, and wherein said step (e) further comprises the step of obtaining the degree of similarity between at least one picture element included in each of said small mountains and the picture elements excluded from said small mountains for each small mountain in accordance with hue and saturation values and in the color original image so as to permit determination of whether or not the distance between each of the picture elements excluded from said small mountain and each of the obtained core picture elements is a minimum to thereby obtain the degree of similarity between at least one picture element included in each small mountain and the picture elements excluded from said small mountain.

10. A method of extracting human face image data, comprising the steps of:
(a) dividing a color original image into a plurality of picture elements and resolving each picture element into red, green, and blue colors, wherein each of said colors is photometrically measured;
(b) obtaining color regions with the same or similar hue on said color original image in accordance with data obtained through the photometry;
(c) assuming circles or ellipses inscribed with respect to boundary portions of the obtained color regions and dividing the color regions obtained using circular or elliptic regions starting from the largest circle or ellipse in order to thereby obtain a plurality of divided regions; and
(d) selecting at least one of the divided regions from which to extract the data of the selected region as human face image data.

11. A method of extracting human face image data, comprising the steps of:
(a) dividing a color original image into a plurality of picture elements and resolving each picture element into three colors of red, green, and blue, wherein each of said colors is photometrically measured;
(b) obtaining color regions with the same or similar hue on said color original image in accordance with data obtained through the photometry;
(c) assuming circles or ellipses inscribed with respect to boundary portions of the obtained color regions to thereby obtain the largest circular or elliptic region;
(d) obtaining a convex region having a predetermined or larger area protruding outward from the circumference of a circle or ellipse and contacted to said obtained region to thereby divide said color region by the circular region inscribed with respect to the boundary portion of the color regions included in said convex portion to thereby obtain a plurality of divided regions; and
(e) selecting at least one of the divided regions from which to extract the data of the selected region as human face image data.

* * * * *